United States Patent
Emura

(10) Patent No.: US 10,846,813 B2
(45) Date of Patent: Nov. 24, 2020

(54) DEVICE, METHOD, AND PROGRAM FOR PRESENTING PRE-RACE MOVEMENTS OF A RACER

(71) Applicant: RAKUTEN INC., Tokyo (JP)

(72) Inventor: Sadaaki Emura, Tokyo (JP)

(73) Assignee: Rakuten, Inc., Tokyo (JP)

( * ) Notice: Subject to any disclaimer, the term of this patent is extended or adjusted under 35 U.S.C. 154(b) by 771 days.

(21) Appl. No.: 15/123,736

(22) PCT Filed: Jan. 30, 2015

(86) PCT No.: PCT/JP2015/052720
§ 371 (c)(1),
(2) Date: Sep. 6, 2016

(87) PCT Pub. No.: WO2016/121111
PCT Pub. Date: Aug. 4, 2016

(65) Prior Publication Data
US 2017/0011484 A1    Jan. 12, 2017

(51) Int. Cl.
*G06Q 50/34* (2012.01)
*G06F 16/904* (2019.01)
(Continued)

(52) U.S. Cl.
CPC ......... *G06Q 50/34* (2013.01); *G06F 16/5854* (2019.01); *G06F 16/904* (2019.01); *G06N 5/022* (2013.01); *G07F 17/32* (2013.01)

(58) Field of Classification Search
CPC ........ G06Q 50/34; G06Q 10/04; G06Q 10/06; G06F 17/30259; G06F 17/30994;
(Continued)

(56) References Cited

U.S. PATENT DOCUMENTS

| 6,860,806 B2 * | 3/2005 | Kojima | G07F 17/3288 463/40 |
| 2002/0132658 A1 * | 9/2002 | Brown | G07F 17/3211 463/16 |

(Continued)

FOREIGN PATENT DOCUMENTS

| JP | 58-162222 A | 9/1983 |
| JP | 2003-228701 A | 8/2003 |

(Continued)

OTHER PUBLICATIONS

Hutson et al., "Pre-race behaviour of horses as a predictor of race finishing order", Jul. 1997, Applied Animal Behaviour Science, vol. 53, Issue 4, pp. 231-248 (Year: 1997).*

(Continued)

*Primary Examiner* — Robert A Cassity
*Assistant Examiner* — Brent Johnston Hoover
(74) *Attorney, Agent, or Firm* — Sughrue Mion, PLLC

(57) ABSTRACT

To make predictions about racing, a point to pay attention to in pre-race movements of each racer can be presented. To this end, for racers entered in a race to be processed, a plurality of captured pre-race movement images of pre-race movements made by the racers before a race are retrieved. By using the retrieved pre-race movement images and racing result information corresponding to each pre-race movement image, an attention point to be paid attention to while each racer is making pre-race movements are identified. Presentation information for presenting information about the identified attention point is then generated and controlled to be presented to a user on an external terminal.

11 Claims, 15 Drawing Sheets

(51) Int. Cl.
 *G06F 16/583* (2019.01)
 *G06N 5/02* (2006.01)
 *G07F 17/32* (2006.01)

(58) Field of Classification Search
 CPC ... G06F 16/5854; G06F 16/904; G06N 5/022;
 G07F 17/32; G07F 17/323; G07F
 17/3288; H04N 7/18; H04Q 7/00; G06K
 9/00369; A63F 13/00; G08B 1/08; G01S
 19/04; G01S 19/19; G06T 2207/30241
 USPC ............... 706/46; 463/6, 42, 25; 340/539.13
 See application file for complete search history.

(56) References Cited

U.S. PATENT DOCUMENTS

| | | | | |
|---|---|---|---|---|
| 2005/0044575 A1* | 2/2005 | Der Kuyl | ............... | A63F 13/12 725/100 |
| 2005/0059495 A1* | 3/2005 | Horowitz | ............... | G07F 17/32 463/42 |
| 2007/0118239 A1* | 5/2007 | Zimmermann | ........ | G06Q 10/10 700/92 |
| 2008/0036587 A1* | 2/2008 | Meinzen | ................ | G01S 19/04 340/539.13 |
| 2008/0139264 A1* | 6/2008 | He | ......................... | G06Q 50/34 463/6 |
| 2009/0042628 A1* | 2/2009 | Yoda | .................. | G06K 9/00369 463/6 |
| 2009/0149233 A1* | 6/2009 | Strause | .................. | G06Q 50/34 463/7 |
| 2012/0062750 A1* | 3/2012 | Nakajima | ........... | G07F 17/3288 348/157 |
| 2012/0288160 A1* | 11/2012 | McVey | ..................... | G06K 9/52 382/110 |

FOREIGN PATENT DOCUMENTS

| | | | |
|---|---|---|---|
| JP | 2004-272680 A | | 9/2004 |
| JP | 2006-048571 A | | 2/2006 |
| JP | 2008-097389 A | | 4/2008 |
| JP | 2009045315 A | * | 3/2009 |
| JP | 2010-282456 A | | 12/2010 |
| JP | 5801985 B1 | | 10/2015 |
| WO | 2011/065563 A1 | | 6/2011 |
| WO | WO-2011065563 A1 | * | 6/2011 ............. G06Q 10/04 |

OTHER PUBLICATIONS

International Search Report for PCT/JP2015/052720 dated Apr. 21, 2015 [PCT/ISA/210].
Written Opinion for PCT/JP2015/052720 dated Apr. 21, 2015 [PCT/ISA/237].

* cited by examiner

USER DB

| USER ID |
|---|
| PASSWORD |
| NICKNAME |
| NAME |
| BIRTH DATE |
| GENDER |
| ZIP CODE |
| ADDRESS |
| TELEPHONE NUMBER |
| E-MAIL ADDRESS |
| CREDIT CARD INFORMATION |
| · |
| · |
| · |

RACING INFORMATION DB

| | | |
|---|---|---|
| RACE ID | | |
| RACE NAME | | |
| GRADE | | |
| RACETRACK NAME | | |
| RACE DATE | | |
| CLOSING TIME FOR SALE OF BETTING TICKETS | | |
| POST TIME | | |
| RACE NUMBER | | |
| TRACK INFORMATION | | |
| ENTERED HORSE INFORMATION | NUMBER OF ENTERED HORSE | |
| | POST POSITION | |
| | HORSE NAME | |
| | HORSE ID | |
| | WEIGHT | |
| | INCREASE OR DECREASE IN WEIGHT AFTER PREVIOUS RACE | |
| | PAST RACE TIME INFORMATION | |
| | TOTAL WINS INFORMATION | |
| | WINNING PERCENTAGE INFORMATION | |
| | BEST TIME | |
| | ODDS | |
| JOCKEY INFORMATION | HORSE NUMBER OF RACEHORSE | |
| | JOCKEY NAME | |
| | JOCKEY'S PAST RESULTS | |
| | WHETHER JOCKEY HAS EVER BEEN CHANGED | |
| RACING RESULTS | PLACE | |
| | RACE TIME | |
| | DIVIDENDS | |
| · | · | |
| · | · | |
| · | · | |

RACE XX

POINTS TO CHECK IN PADDOCK

| NUMBER | HORSE NAME | POINTS TO CHECK |
|---|---|---|
| 1 | . . . | . . . |
| 2 | . . . | . . . |
| 3 | . . . | . . . |
| 4 | . . . | . . . |
| 5 | . . . | . . . |
| 6 | . . . | . . . |
| 7 | . . . | . . . |
| 8 | . . . | . . . |
| 9 | . . . | . . . |

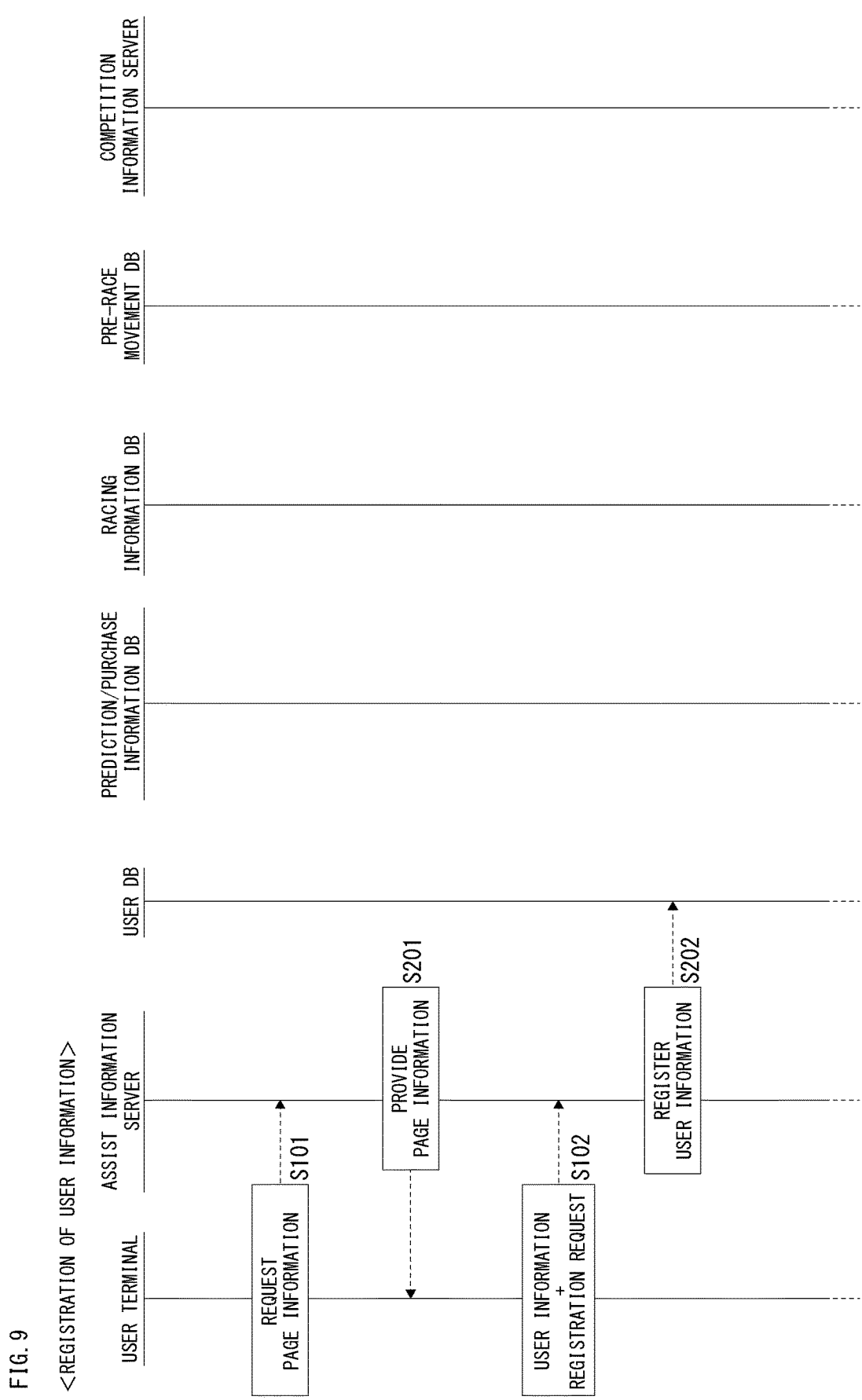

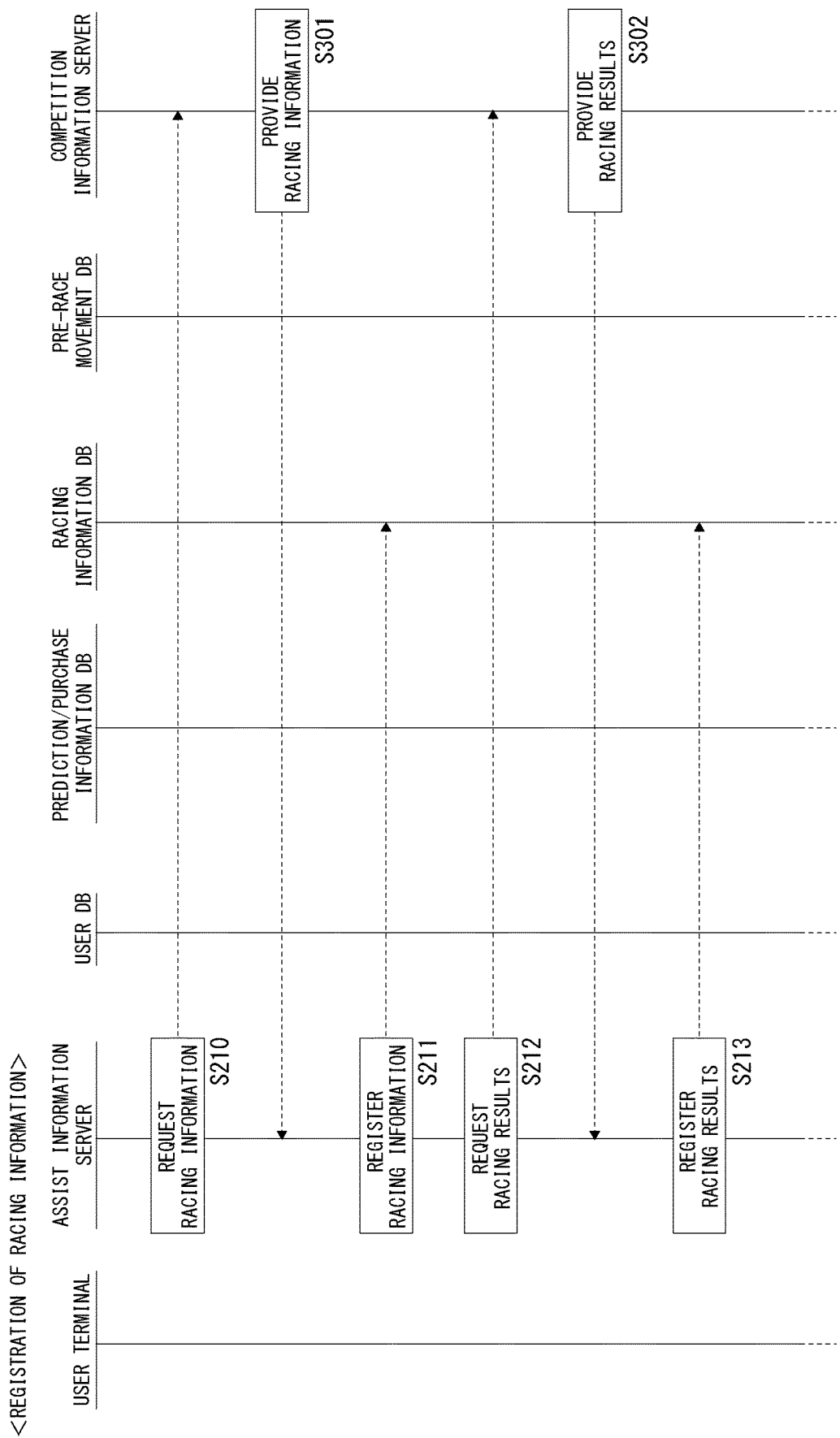

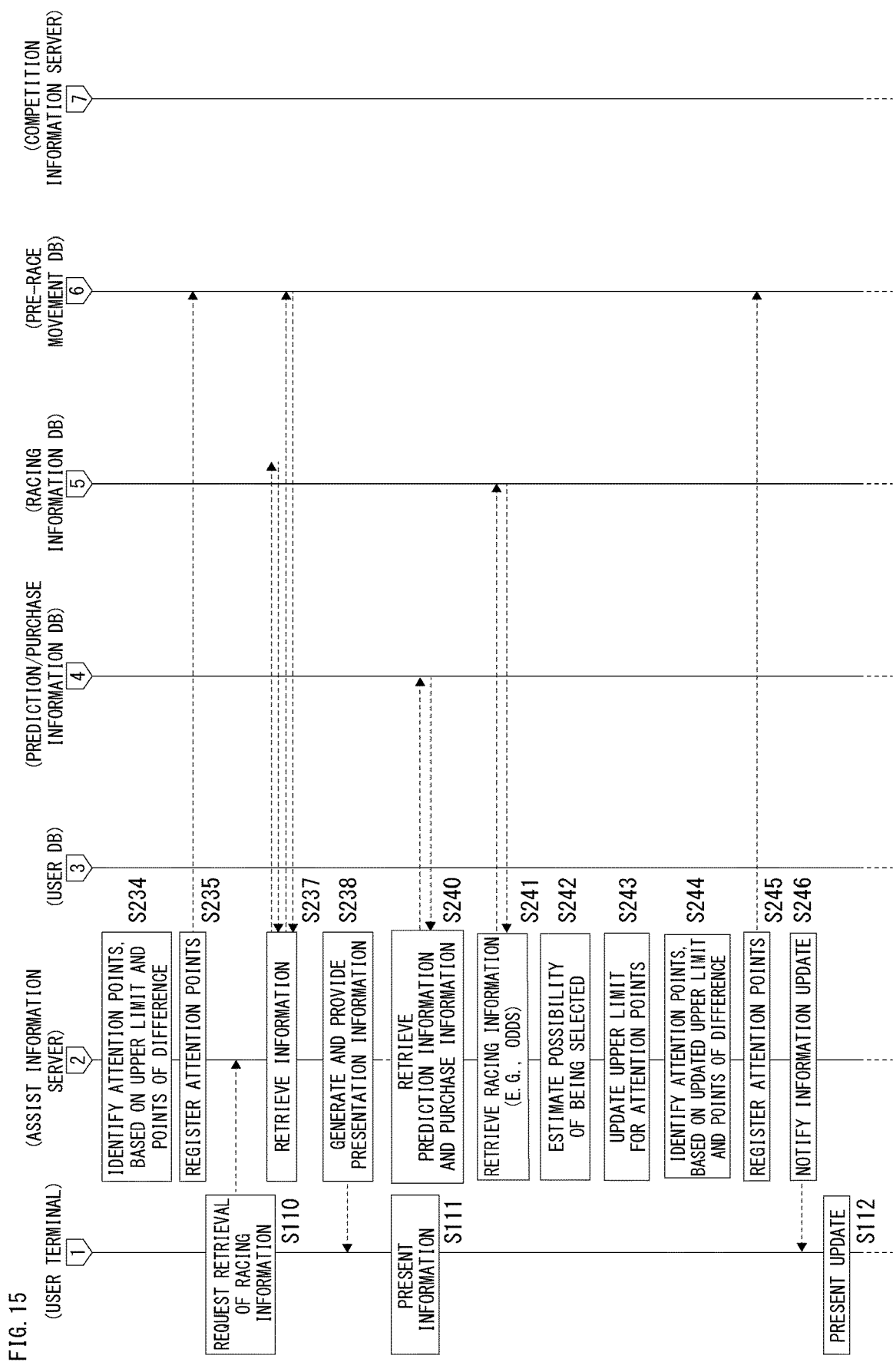

DEVICE, METHOD, AND PROGRAM FOR PRESENTING PRE-RACE MOVEMENTS OF A RACER

CROSS REFERENCE TO RELATED APPLICATIONS

This application is a National Stage of International Application No. PCT/JP2015/052720 filed Jan. 30, 2015, the contents of all of which are incorporated herein by reference in their entirety.

TECHNICAL FIELD

The present invention relates to an information processing device, an information processing method, and a program, and in particular, to techniques for providing information about races, such as horse racing and motorboat racing.

CITATION LIST

Patent Literature

Patent Literature 1: JP 2004-272680 A

BACKGROUND ART

In competition runs (races), such as horse racing and motorboat racing, various placing predictions and data for prediction that are used to purchase betting tickets such as horse betting tickets (horse tickets) or boat betting tickets (boat tickets) are made public. For example, a bettor makes predictions by referring to a shrewd tipster's predictions that appear on the Internet, in a newspaper, or the like, or by observing a paddock for horse racing to check the condition of racehorses. In addition, there is a service that distributes paddock images over the Internet. This service enables people who wish to purchase horse betting tickets to check, without visiting a racetrack, the condition of racehorses in the paddock.

The above Patent Literature 1 discloses a system that provides a past race video or a paddock video, in which racehorses appear, when a user selects some part of a racecard displayed on a terminal.

SUMMARY OF INVENTION

Technical Problem

For example, many users who post their predictions or purchase horse betting tickets over the Internet watch racers (e.g., entered racehorses) that appear in images of pre-race movements made before a race (e.g., paddock moving images), and make predictions or consider purchases. However, it is actually difficult for tipsters and bettors except leading experts to examine prediction targets from pre-race movement images (e.g., paddock moving images). Examples of the reason are as follows.

Which part of a racer (e.g., racehorse) to watch depends on the racer. For example, whether to watch how a racehorse swings its head or to pay attention to its tail to estimate its condition depends on the racehorse.

The criteria for examining whether a racer is good or bad vary depending on the racer. For example, what is a good or bad sign for a racehorse depends on the racehorse.

It is troublesome to check all pre-race movement images of entered racers.

Which racer to preferentially check depends on who the tipster or the bettor is. In particular, beginners are likely to check more racers than experts.

Therefore, it is an object of the present invention to provide a service that assists a tipster in making predictions or a bettor in considering purchases from pre-race movement images, such as paddock moving images.

Solution to Problem

An information processing device according to the present invention includes a racer identification unit, an attention point identification unit, and a presentation controller. The racer identification unit identifies racers entered in a race to be processed. For each of all or some of the racers identified by the racer identification unit, the attention point identification unit retrieves a plurality of captured pre-race movement images of pre-race movements made by a racer before a race from a storage unit. Using the retrieved pre-race movement images and racing result information corresponding to each pre-race movement image, the attention point identification unit identifies an attention point to be paid attention to while pre-race movements are being made. The presentation controller generates presentation information for presenting information about the attention point identified by the attention point identification unit. The presentation controller then controls presentation of the presentation information on an external terminal.

An attention point for each racer (e.g., racehorse) is identified from racing result information corresponding to images of pre-race movements, such as paddock walks in horse racing and exhibition runs in motorboat racing. Presentation information including information about this attention point is provided to a user's terminal (external terminal). This information is to be a guide while the user is watching pre-race movement images to determine the condition of racers.

In the above information processing device, as a process for identifying an attention point for a racer, the attention point identification unit preferably extracts a type 1 pre-race movement image being a pre-race movement image of a race that ended in a good racing result and a type 2 pre-race movement image being a pre-race movement image of a race that ended in a bad racing result, from among a plurality of pre-race movement images in which the corresponding racer appears, based on racing result information about a race corresponding to each pre-race movement image, and identifies all or some of one or a plurality of points of difference identified based on a comparison between the type 1 pre-race movement image and the type 2 pre-race movement image as an attention point of the corresponding racer.

To identify an attention point, it will be preferable that pre-race movement images be classified as a type 1 pre-race movement image captured when a good result was obtained or a type 2 pre-race movement image captured when a bad result was obtained and that a point of difference of a racer be searched for by comparing these images.

In the above information processing device, it is preferable that the attention point identification unit preferentially identify, from among the identified points of difference, a point of difference that shows a relatively large degree of difference as compared with other points of difference as an attention point.

An attention point is information as a guide to which point users should pay attention to while watching pre-race movement images. Thus, it is helpful to select an item with a difference that is easy for the users to notice as the attention point.

In the above information processing device, the attention point identification unit may perform, for each racer, an estimation process for estimating a possibility of being selected that is a possibility that information provision will be requested, set an upper limit for the number of attention points so that more attention points are settable to a racer with a stronger estimated possibility of being selected, and identify, in a process for identifying an attention point for each racer, an attention point within the upper limit.

Information requested by users is different in quality and quantity between a racer about which the users request little information and a high-visibility racer. Thus, served information is improved by increasing the number of attention points for a racer about which users are likely to request information.

In this case, it is possible that the estimation process estimates the possibility of being selected, using a value indicating how likely a predicted place is to be higher.

That is because users are likely to request information about racers that compete for higher places.

It is also possible that the estimation process estimates the possibility of being selected, using at least either prediction information or purchase information of a user of the external terminal on which the presentation information is to be presented.

This is because information about a racer that appears in the user's prediction information is likely to be requested. This is also because based on a user's actual predictions and purchases, which racer the user or users in general are concerned with can be estimated, that is, the predictions and the purchases relate to the possibility that the user will request information about the racer.

In the above information processing device, the presentation controller preferably generates presentation information by which how each attention point is when a good racing result is obtained and how each attention point is when a bad racing result is obtained can be distinguished.

Presenting not just an attention point but information indicating how the attention point is in good condition or in bad condition makes the information more desirable to users.

In the above information processing device, the attention point identification unit preferably performs a process for identifying an attention point, using pre-race movement images of a race that matches a race to be processed in racing conditions.

The behavior of a racer is possibly affected by racing conditions. Thus, use of past pre-race movement images captured under matched racing conditions enhances the reliability of identifying an attention point of the racer in a race to be processed.

In the above information processing device, the attention point identification unit preferably performs, for each racer, a process for identifying an attention point, using pre-race movement images of a race having racer information that matches racer information in a race to be processed.

The behavior of a racer is possibly affected also by the condition of the racer itself. Thus, use of past pre-race movement images with matched racer information enhances the reliability of identifying an attention point of the racer.

An information processing method according to the present invention is an information processing method performed by an information processing device. The method includes the following steps. Racers entered in a race to be processed are identified. For each of all or some of the identified racers, a plurality of captured pre-race movement images of pre-race movements made by a racer before a race are retrieved. By using the retrieved past pre-race movement images and racing result information corresponding to each pre-race movement image, an attention point to be paid attention to while pre-race movements are being made are identified. Presentation information for presenting information about the identified an attention point is generated and controlled to be presented on an external terminal.

This information processing method can identify an attention point of each racer in their pre-race movements and provide users with information about the attention point as a guide in watching pre-race movement images.

A program according to the present invention is a program for causing an information processing device to perform such an information processing method.

Advantageous Effects of Invention

According to the present invention, points to pay attention to while observing pre-race movements of a racer can be presented to a user. Thus, a service capable of accurately assisting the user who is considering predictions or purchase of betting tickets can be achieved.

BRIEF DESCRIPTION OF DRAWINGS

FIG. 4A is a diagram illustrating a user information database according to the embodiments;

FIG. 4B is a diagram illustrating a racing information database according to the embodiments;

FIG. 9 is a flowchart of a user information registration process according to the embodiments;

FIG. 10 is a flowchart of a racing information registration process according to the embodiments;

FIG. 15 is a flowchart of the third embodiment.

DESCRIPTION OF EMBODIMENTS

Embodiments will be described in the following order.
1. System Configuration

2. Functional Configuration of Information Providing Server, Databases, Presentation Format
3. Registration Process
4. First Embodiment
5. Second Embodiment
6. Third Embodiment
7. Summary and Modification
8. Program and Storage Medium In the embodiments, an assist information server capable of providing information that can assist a user while the user is watching paddock moving images to make predictions about placings in horse racing or consider which horse betting tickets to purchase is taken as an example of an information processing device according to the claims of the present invention.

The assist information server is implemented on one or more information processing devices. Thus, the information processing device according to the claims of the present invention is implemented on one information processing device or on a plurality of information processing devices that cooperate with each other.

Words used in the embodiments are defined as follows.

A "competition run (race)" is used to mean an individual race that produces one racing result, for example, one race in horse racing. For example, when a plurality of races, such as the first to tenth races, are held in the same racetrack on the same day, each of the races corresponds to a "competition run" or a "race".

A "racer" means a thing that runs a race, for example, a racehorse for horse racing.

"Pre-race movements" are used to mean predetermined movements made just before a race, such as a paddock walk in horse racing or an exhibition run in motorboat racing.

"Racing information" is a general term for information about races, such as racetracks, dates, race numbers, racing ranks or types, weather, temperature, humidity, track conditions, running distances, rival horses, jockeys, odds, racing results (e.g., placings, race times, and dividends).

1. System Configuration

Figure 1:
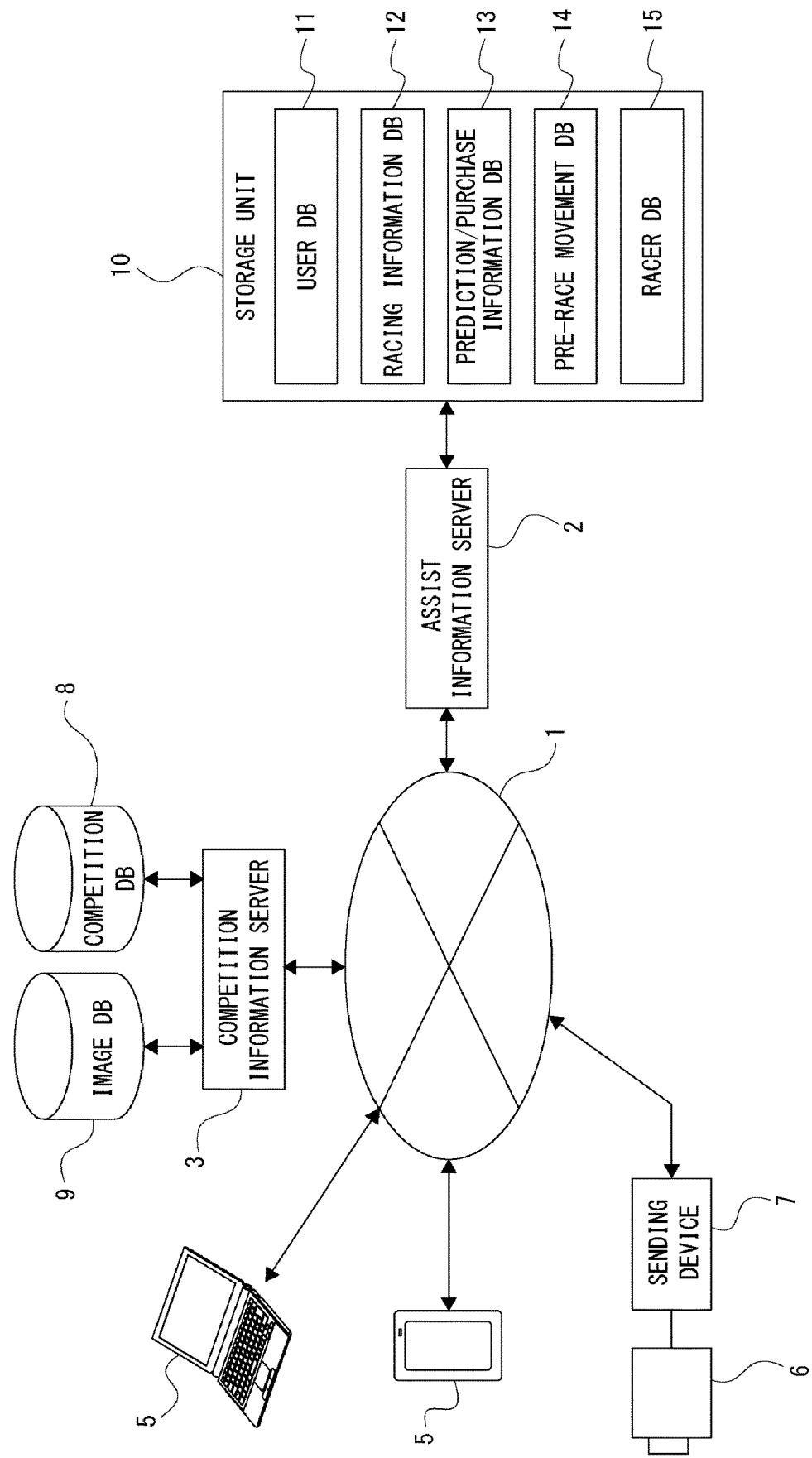
FIG. 1 is a block diagram of a system configuration according to embodiments of the present invention.

FIG. 1 shows an example configuration of a network system including an assist information server 2 according to the embodiments.

In the network system according to the present embodiments, the assist information server 2, a competition information server 3, and a plurality of user terminals 5 are connected via a network 1 so as to be capable of communicating with each other.

As shown in the figure, the network system may include, for example, an image-capturing device 6 that captures images of the paddock of a racetrack and a sending device 7 that is capable of sending the images captured by the image-capturing device 6 to a predetermined information processing device (e.g., the competition information server 3 and the assist information server 2) over the network 1.

In addition, a competition database 8, an image database 9, and a storage unit 10 including various databases are provided for operation of the system. Hereinafter, "database" is referred to as "DB".

There are various possible example configurations of the network 1. The examples can include not only the Internet but also an intranet, an extranet, a local area network (LAN), a community antenna television (CATV) network, a virtual private network, a telephone network, a mobile communication network, and a satellite communication network.

There are also various possible examples of a transmission medium constituting all or part of the network 1. The examples can include not only wires such as an Institute of Electrical and Electronics Engineers (IEEE) 1394, a universal serial bus (USB), a power-line communication, and a telephone line; but also wireless such as infrared light like infrared data association (IrDA), Bluetooth (registered trademark), 802.11 wireless, a mobile telephone network, a satellite channel, and a digital terrestrial network.

The assist information server 2 performs a process for providing information to assist a user in making predictions about horse racing or in considering which horse betting tickets to purchase, in particular, information to which the user refers while watching paddock moving images.

The storage unit 10 is provided with a user DB 11, a racing information DB 12, a prediction/purchase information DB 13, a pre-race movement DB 14, a racer DB 15, and other databases. The assist information server 2 stores data in the databases and uses the databases to generate and send information to be presented to users.

The assist information server 2 according to the present embodiments is a server that provides various web pages as a site (horse racing site) that performs a comprehensive horse racing-related service. Although the various services to be provided are not described in detail herein, for example, a home page, a page that provides racing information, a page that provides past information, a page for viewing real-time moving images and archive moving images, a page for purchasing horse betting tickets, a page for posting predictions on which predictions about races can be freely posted are provided. A user can access such a horse racing site with the user terminal 5 to make predictions or purchase horse betting tickets. Of course, in this case, the user can watch paddock moving images to make predictions and then purchase horse betting tickets based on them.

The present embodiments describe the assist information server 2, which provides such a horse racing site, focusing on a service for providing information to assist in watching paddock moving images.

The competition information server 3 is a server that externally provides various types of racing information stored in the competition DB 8 and paddock moving images of various races stored in the image DB 9.

The competition DB 8 is a DB that stores various types of information about past or scheduled horse races. For example, the competition DB 8 stores racing environment information about past or scheduled horse races, that is, information about each horse race, such as a race date, a racetrack, entered horses, jockeys, weather-related information, and odds. The competition DB 8 also stores racing result information about past races, that is, information about each race, such as placings, each horse's time, and dividends.

The competition information server 3 is capable of retrieving various types of horse racing-related information from the competition DB 8 and sending the information, for example, in response to a request from the assist information server 2.

Every time a horse race is held, the competition information server 3 stores racing environment information and racing result information about the race in the competition DB 8.

The competition information server 3 also stores horse racing-related images in the image DB 9 and sends image information, for example, to the assist information server 2.

For example, pre-race movement images (moving images of entered racehorses being in a paddock) captured by the image-capturing device 6, such as a fixed point camera installed in the paddock of a racetrack, are sent by the sending device 7 to the competition information server 3 over the network 1, and are stored with metadata added to the image data in the image DB 9. The competition information server 3 is capable of sequentially sending the captured images stored in the image DB 9 to the assist information server 2.

The images stored in the image DB 9 include not only paddock moving images but also actual racing moving images and various kinds of still images. Unless otherwise specified, "image data" described below means moving image data including captured images of pre-race movements of entered racehorses, such as paddock walks.

The images captured by the image-capturing device 6 may be sent by the sending device 7 directly to the assist information server 2.

The user terminal 5 is an information processing device that is operated by a user who purchases horse betting tickets. The user terminal 5 is implemented on one of various types of information processing devices including a personal computer, a smartphone, a feature phone, and a tablet device.

Using the user terminal 5, the user can send, to the assist information server 2, a request for providing information and view the information sent from the assist information server 2 in response to this request.

Figure 2:
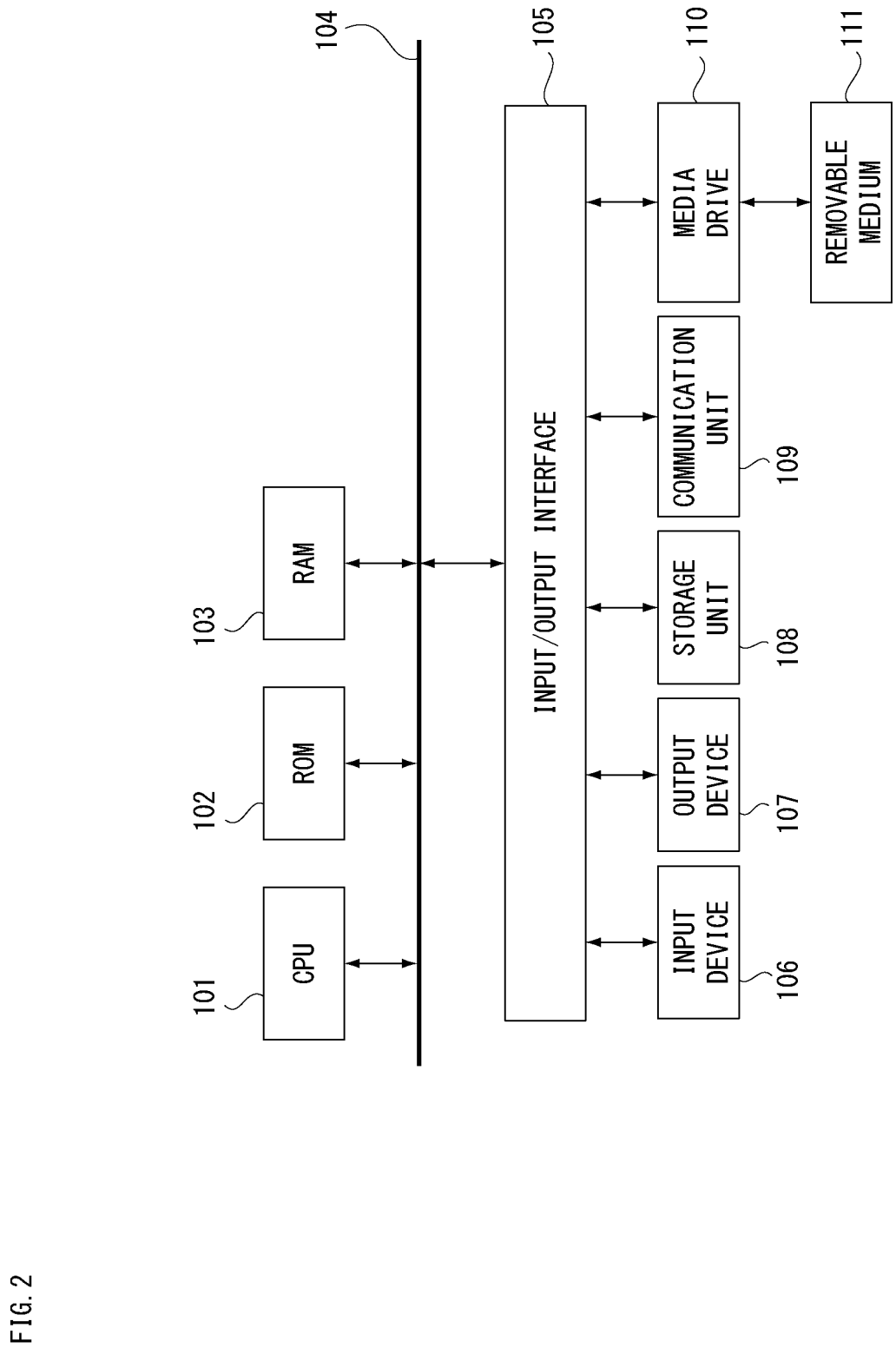
FIG. 2 is a block diagram of a configuration of an information processing device according to the embodiments.

Each of these devices shown in FIG. 1, the assist information server 2, the competition information server 3, the user terminal 5, and the sending device 7, can be implemented as such a computer device as shown in FIG. 2. The computer device is capable of performing information processing and information communications.

In FIG. 2, a central processing unit (CPU) 101 of the computer device performs various processes in accordance with programs stored in a read only memory (ROM) 102 or programs loaded from a storage unit 108 to a random access memory (RAM) 103. The RAM 103 also stores data required for the CPU 101 to perform the various processes and other data as appropriate.

The CPU 101, the ROM 102, and the RAM 103 are connected to each other via a bus 104. An input/output interface 105 is also connected to this bus 104.

An input device 106, an output device 107, the storage unit 108, and a communication unit 109 are connected to the input/output interface 105. The input device 106 includes, for example, a keyboard, a mouse, and a touch screen. The output device 107 includes, for example, a speaker and a display, such as a liquid crystal display (LCD), a cathode ray tube (CRT), or an organic electroluminescent (EL) panel. The storage unit 108 includes, for example, hard disk drives (HDDs) and flash memory devices. The communication unit 109 performs communication processing and inter-device communications over the network 1.

A media drive 110 is also connected to the input/output interface 105 as needed. A removable medium 111, such as a magnetic disk, an optical disk, a magneto-optical disk, or a semiconductor memory, is mounted in the media drive 110 as appropriate, and information is then written to and read from the removable medium 111.

This computer device is capable of uploading and downloading data and programs through communications by the communication unit 109, and is capable of exchanging data and programs via the removable medium 111.

The CPU 101, which performs processing operations in accordance with various programs, performs information processing and communications required for the assist information server 2, the competition information server 3, the user terminal 5, or the sending device 7.

An information processing device constituting each of the assist information server 2, the competition information server 3, the user terminal 5, the sending device 7, and other devices 5 is not limited to a single computer device as shown in FIG. 2, and may include a plurality of computer devices integrated into a system. The plurality of computer devices may be integrated into a system, for example, via a LAN, or may be located remote from each other, for example, over a VPN using the Internet.

Figure 3:
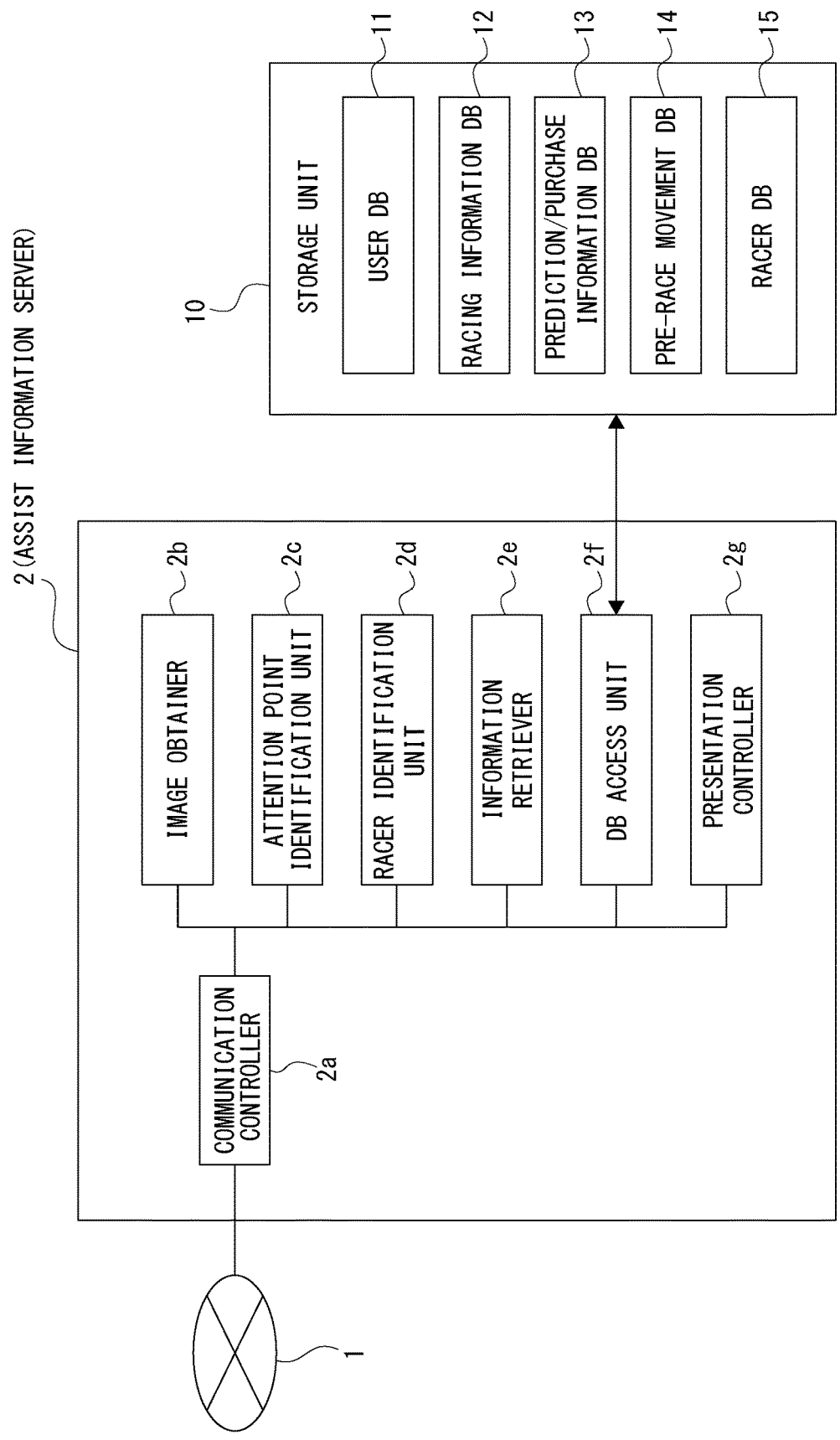
FIG. 3 is a diagram illustrating a functional configuration of an assist information server according to the embodiments.

2. Functional Configuration of Information Providing Server, Databases, Presentation Format FIG. 3 illustrates a functional configuration of the assist information server 2 that is implemented on one or more information processing devices and various DBs in the storage unit 10.

The functions of the assist information server 2 are implemented by processes performed by the CPU(s) 101 of the information processing device(s) in accordance with programs. However, all or some processes in each component described below may be implemented in hardware.

Each function implemented in software need not be implemented in a separate program. The processes of a plurality of functions may be performed by one program. Alternatively, one function may be implemented by cooperation between a plurality of program modules.

The assist information server 2 includes a communication controller 2a, an image obtainer 2b, an attention point identification unit 2c, a racer identification unit 2d, an information retriever 2e, a DB access unit 2f, and a presentation controller 2g.

The communication controller 2a is shown as a unit that performs various processes for exchanging information with an external device over the network 1.

For example, the communication controller 2a sends a request for racing information to the competition information server 3 and receives the corresponding racing information. The communication controller 2a also receives image data from the competition information server 3 and the sending device 7. The communication controller 2a also receives a request for assist information from the user terminal 5 and sends presentation information including the content of the assist information.

The communication controller 2a also performs, for example, decoding, encoding, compression, decompression, or file format conversion of data when exchanging these pieces of information. The communication controller 2a also performs, for example, a process for login and authentication from the user terminal 5.

The image obtainer 2b is a function that obtains image data sent, for example, from the competition information server 3 or the sending device 7 via the communication controller 2a and buffers the image data so that the image data is stored in the DBs or used for a predetermined process.

For each of all or some racers that the racer identification unit 2d identifies as racers entered in a race to be processed, the attention point identification unit 2c retrieves previously captured pre-race movement images (paddock moving images) of pre-race movements that the racer made before the race from the storage unit 10. Using a plurality of retrieved pre-race movement images and racing result information corresponding to each of the pre-race movement images, the attention point identification unit 2c performs a process for identifying an attention point to be paid attention to while pre-race movements are being made.

Specifically, the attention point identification unit 2c retrieves, for each racer (each racehorse), paddock moving images from the storage unit 10 as needed to identify an attention point. The attention point identification unit 2c then compares a plurality of paddock moving images for each racehorse. For example, the attention point identification unit 2c detects a point of difference between a paddock moving image of a race that ended in a good result (e.g., a race that the racehorse finished in a higher place) and a paddock moving image of a race that ended in a bad result (e.g., a race that the racehorse finished in a lower place). That is, the attention point identification unit 2c analyzes a plurality of past paddock moving images and still images extracted from the moving images (each still image is a frame of image in the moving images) to search for a point at which changes in the condition between good and bad races are observed.

For example, the attention point identification unit 2c compares the condition of the racehorse in a paddock, such as the angle of its neck, the angle of its ears, how its tongue was (e.g., how its tongue was put out), how its eyes were (e.g., how much its eyes were bloodshot), and where the racehorse walked (inside, outside, or meandering), between still images in a plurality of images to search for a point of difference.

The attention point identification unit 2c also compares the movements of the racehorse in the paddock, such as how many times or how often the racehorse swung its head, how many times or how often the racehorse swung its tail, how the racehorse tends to walk (pulling, normal, or pulled), its walking speed in the paddock, and its stride in the paddock, between a plurality of paddock moving images or based on data obtained based on the moving images to search for a point of difference.

The attention point identification unit 2c then identifies all or some of the extracted one or a plurality of points of difference as an attention point.

The racer identification unit 2d performs a process for identifying racers entered in a race to be processed. For example, in response to a request from the user terminal 5, the racer identification unit 2d identifies a race and then identifies racers entered in the race. All or some of the racers entered in a race to be processed, which are identified by the racer identification unit 2d, become racer(s) to be processed to generate and send presentation information for assisting in making predictions. That is, the attention point(s) for the racehorse(s) identified by the racer identification unit 2d, which is identified by attention point identification unit 2c, is provided as assist information for a user who watches paddock moving images to the user terminal 5.

The information retriever 2e retrieves, for example, information (racing information) to be stored in the DBs of the storage unit 10 from the competition information server 3, obtains, for example, user information from the user terminal 5, and stores these in the DBs.

Thus, for example, the information retriever 2e sends an information request to the competition information server 3, imports racing information sent from the competition information server 3 in response to the request, and imports information from the user terminal 5, and buffers these pieces of information so that they are stored in the DBs, one after another.

The DB access unit 2f performs write, search, and read operations to the DBs of the storage unit 10.

Specifically, the DB access unit 2f performs write access for registering the racing information imported by the information retriever 2e in the racing information DB 12 and for registering the user information imported by the information retriever 2e in the user DB 11.

The DB access unit 2f also performs write access for registering each racer's attention point identified by the attention point identification unit 2c and the image data obtained by the image obtainer 2b from the competition information server 3 in the pre-race movement DB 14.

The DB access unit 2f also performs read access for reading information, which is used for the attention point identification unit 2c and the racer identification unit 2d to process, from the racing information DB 12, the prediction/purchase information DB 13, the pre-race movement DB 14, and the user DB 11.

The presentation controller 2g generates assist information helpful in making predictions about coming races, in particular, presentation information including information about an attention point in paddock moving images, and controls presentation of the presentation information on the user terminal 5.

As described above, the assist information server 2 provides a wide variety of horse racing-related information by causing a user 5 to view various web pages as the horse racing site. Page data as these web pages including a variety of information is generated by the function as the presentation controller 2g and is sent to the user terminal 5.

Examples of the DBs (the user DB 11, the racing information DB 12, the prediction/purchase information DB 13, the pre-race movement DB 14, and the racer DB 15) of the storage unit 10 include the following data structures.

The user DB 11 stores information about users who are provided with information helpful in making predictions by the assist information server 2, for example, as shown in FIG. 4A. That is, the user DB 11 stores, in association with each user ID (identification), a login password, a user's nickname, name, birth date, gender, zip code, address, telephone number, e-mail address, credit card information, and other various attributes. In addition to the prediction/purchase information DB 13 to be described later, the user DB 11 may store each user's horse betting ticket purchase history and prediction post history.

The racing information DB 12 stores, for each race, information about the race, for example, as shown in FIG. 4B. For example, the racing information DB 12 stores, in association with a race ID identifying a race, the race's name, type or grade, racetrack name, race date, closing time for sale of horse betting tickets, post time, race number, track information, and other information. For horse racing, examples of the type or grade of a race include the distinction of flat or steeplechase racing, a running distance, the rank of the race, information about memorial or graded stakes, and sponsor information such as national racing or local racing.

Examples of the track information include the distinction of turf, dirt, steeplechase, or other types, and turf or dirt course conditions (firm, good, muddy, or yielding).

The racing information DB 12 also stores entered horse information as racer information. As shown in the diagram, this stores, for each horse entered in the race, the horse's number, post position, horse ID, weight, increase or decrease in weight after the previous race, past race time information, total wins information, winning percentage information, best time (the fastest time that the horse has recorded in races with the same distance), odds, and other information.

The racing information DB 12 also stores jockey information. This stores, for each jockey who is scheduled to ride on one of the entered horses, the horse number of the racehorse on which the jockey is going to ride, the jockey's name, the jockey's past results, whether the jockey has ever been changed (whether the jockey is different from a scheduled jockey), and other information.

The racing information DB 12 also stores placings, race times, dividend information, and other information, as result information of the race.

The placings is information about ranking of all the entered horses.

The race times is information about the running times of all the entered horses.

The prediction/purchase information DB 13 stores prediction information that each user posted about a race on the horse racing site and purchase information about horse betting tickets that each user purchased via the horse racing site, for services provided by the assist information server according to the present embodiments.

Figure 5A:
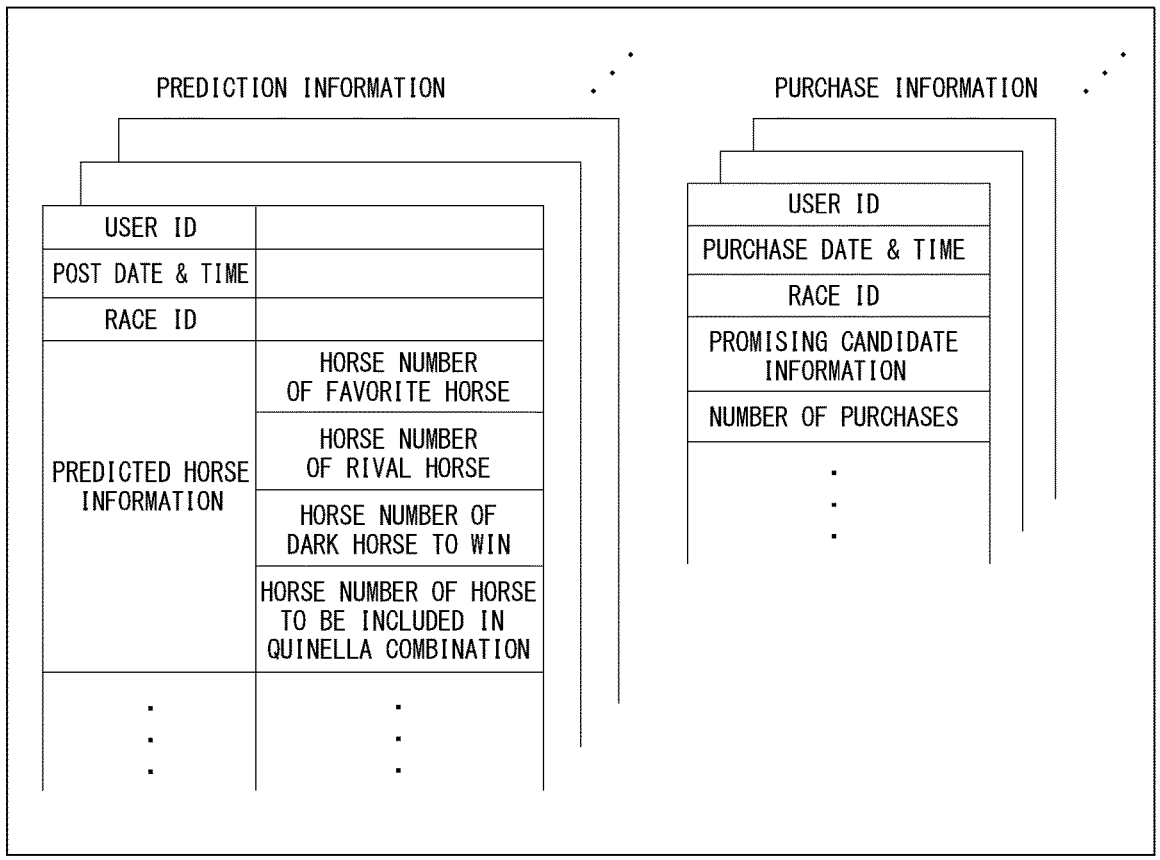
FIG. 5 is a diagram illustrating a prediction/purchase information database and a pre-race movement database according to the embodiments.

As shown in FIG. 5A, for each post, the user ID of the user who made the post, the date and time at which the post was made, the race ID of a race targeted for prediction, predicted horse information, and other information are stored as the prediction information. Examples of the predicted horse information include the numbers of the favorite, a rival horse, a dark horse to win, and a horse to be included in a quinella combination.

For each purchase, the user ID of the user who made the purchase, the date and time at which the purchase was made, the race ID of a target race, promising candidate information, the number of purchases, and other information are stored as the purchase information.

Figure 5B:
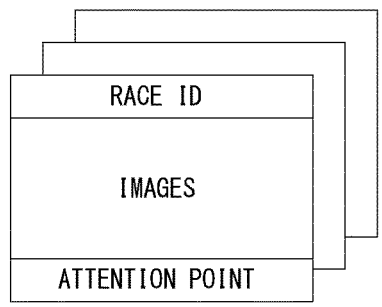

The pre-race movement DB 14 stores, for each race, a race ID, image data, and an attention point of all or some racehorses entered in the race, for example, as shown in FIG. 5B.

The image data includes at least paddock moving images captured just before the race. The image data as the paddock moving images may be separated into different data files for different entered racehorses or may be image data including images of the horses which were sequentially captured as paddock moving image data of the race. The image data only needs to be at least moving image data including captured images of how each horse was in the paddock.

The attention point is stored for each entered racehorse. That is, every time the attention point identification unit 2c identifies an attention point for a racehorse entered in the race, the attention point of the racehorse is stored in the pre-race movement DB 14.

The racer DB 15 stores information about each racer (racehorse). Although not shown, the racer DB 15 is a database from which information about each racehorse, such as the racehorse's name, birth date, age, gender, owner, trainer, stable, past races, racing results can be referred.

The above DBs (the user DB 11, the racing information DB 12, the prediction/purchase information DB 13, the pre-race movement DB 14, and the racer DB 15) may be provided in any configuration accessible to the assist information server 2. For example, all of the DBs 11 to 15 may be created in the storage unit 10, which belongs to the same system as the assist information server 2. Alternatively, all or some of the DBs 11 to 15 may be provided, for example, in a separated or remote computer system. Of course, the DBs 11 to 15 need not be created in one device (e.g., one HDD).

Each of the DBs 11 to 15 need not be configured as one DB. For example, information stored as the user DB 11 may be stored and managed by a plurality of user DBs (e.g., a user DB for login and a user DB for attributes). The DBs 11 to 15 shown in the figures are merely examples where each storage area for information relating to the processes according to the embodiments is illustrated as one DB format.

FIGS. 6, 7, 8A, and 8B show examples of how information provided by the assist information server 2 to the user terminal 5 is presented.

In the present embodiments, while a user is watching paddock moving images, the assist information server 2 presents the user with points to be paid special attention to.

In particular, which part of behavior in a paddock to watch carefully varies from racehorse to racehorse, and whether a behavior is a good sign or a bad sign for each horse is difficult to determine. For this reason, information to assist a user in observing a paddock is presented to solve such difficulty in determining.

Figure 6:
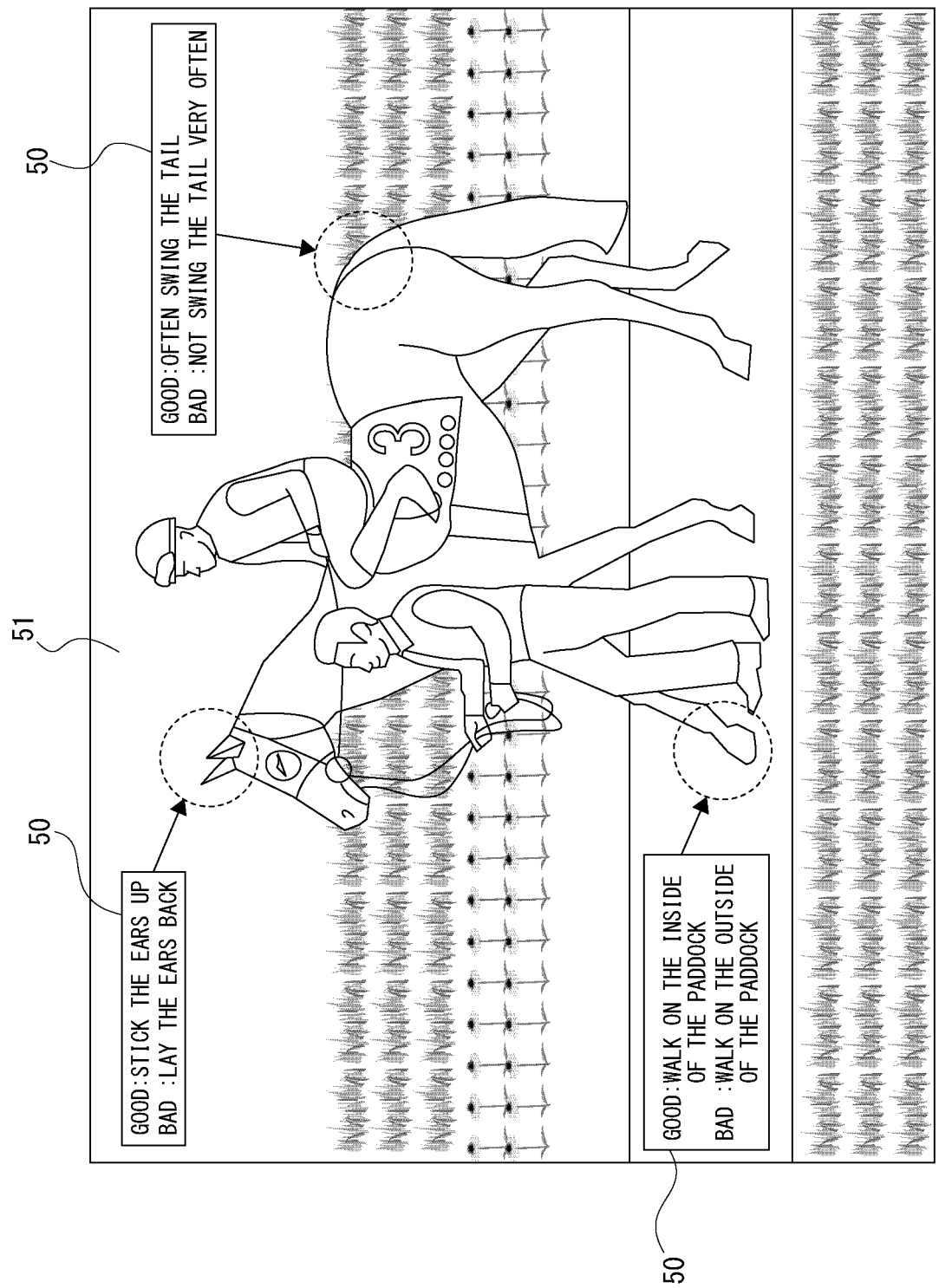
FIG. 6 is a diagram illustrating how attention points are presented in the embodiments.

FIG. 6 shows an example of an image as presentation information. In this example, while a user of the horse racing site is watching a paddock moving image 51 using the user terminal 5, information about attention points is presented over the image so that how each attention point is when a good racing result is obtained and how each attention point is when a bad racing result is obtained can be distinguished.

For example, assume that as attention points for the racehorse wearing number 3, how its ears are, how its tail is, and where the racehorse walks are selected. In this case, images and text as attention point displays 50 are presented over the moving image (or still image). Moreover, in the example of this FIG. 6, not only how the ears are, how the tail is, where the racehorse walks but also text data indicating how those are in a good or bad condition are presented.

Figure 7:
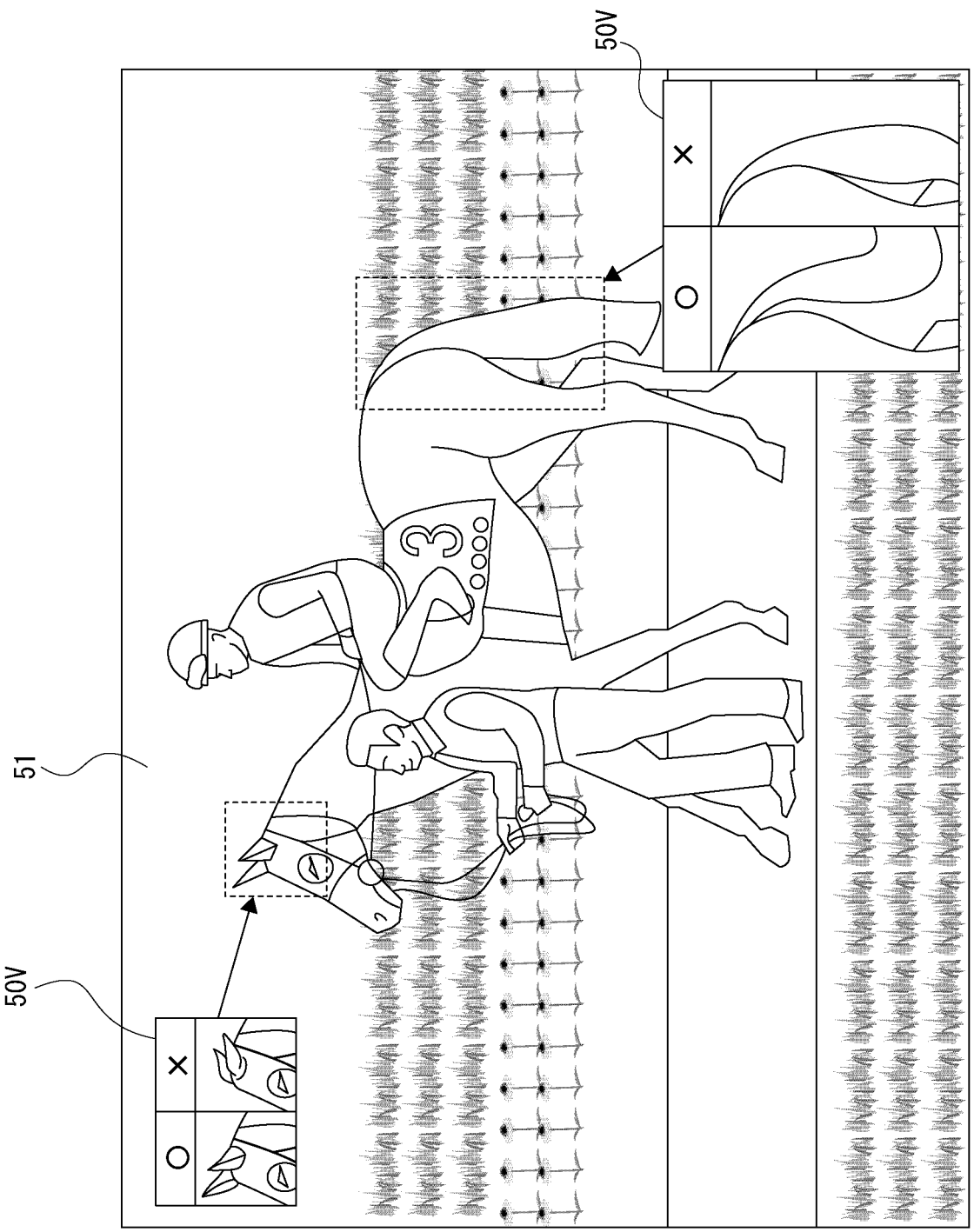
FIG. 7 is a diagram illustrating how attention points are presented in the embodiments.

FIG. 7 illustrates other attention point displays 50v. Each attention point display 50v is a pair of images that indicate good condition and bad condition of the corresponding attention point. For example, each attention point display 50v is a pair of images (still images or moving images) in good and bad condition, which are extracted from past paddock moving images of the racehorse. "O" mark is added to the image in good condition, and "X" mark is added to the image in bad condition. In this manner, attention points and attention point displays 50v, which present good and bad condition, may be superimposed on the paddock moving image 51 using images.

Figures 8A, 8B:
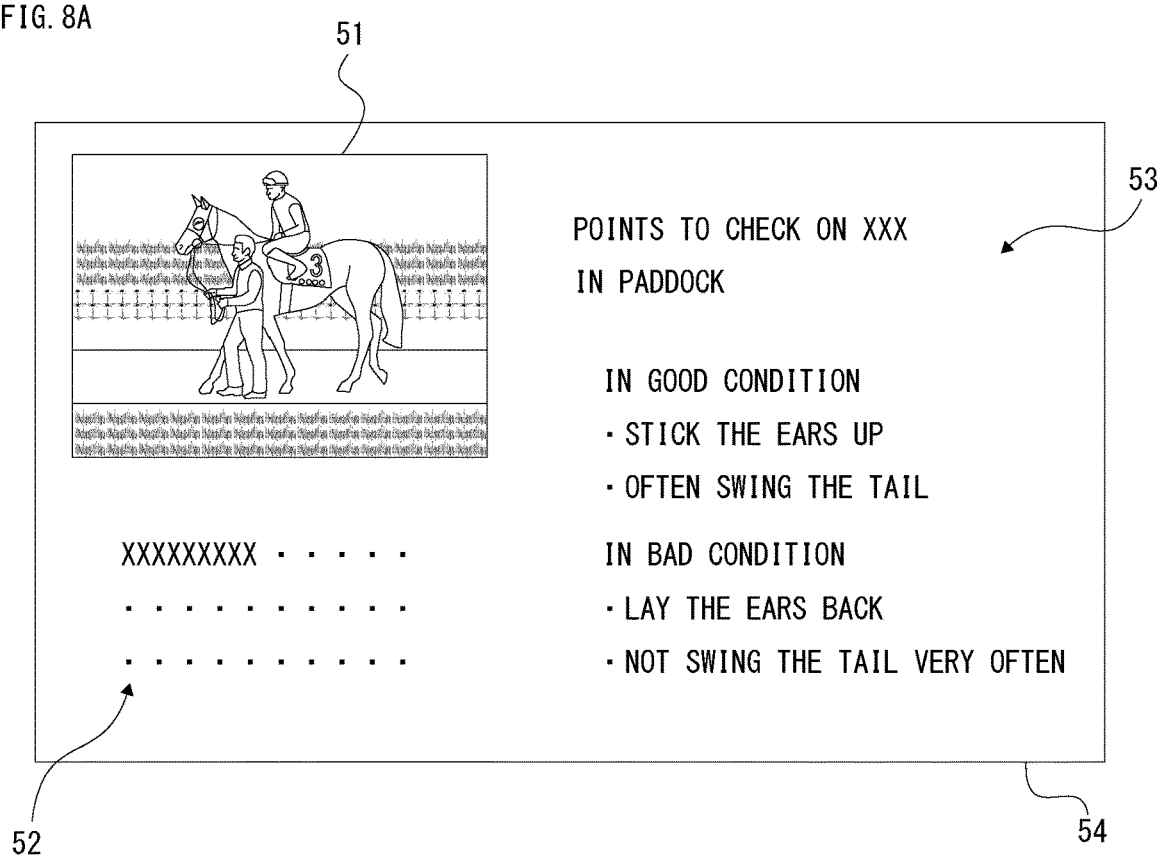
FIGS. 8A and 8B are diagrams illustrating how attention points are presented in the embodiments.

FIG. 8A shows an example where attention points are presented separately from a paddock moving image. As images displayed on the user terminal 5, for example, horse information 52 and points to check 53 are displayed along with the paddock moving image 51. The horse information 52 may be information that can be obtained from the entered horse information in the racing information DB 12 shown in FIG. 4B, such as a horse name, a number, and weight. The points to check 53 is information about attention points identified for the racehorse. This may also be information presenting good condition and bad condition. Although this example presents text, good condition and bad condition may be presented using images as shown in FIG. 7.

FIG. 8B shows an example where points to check on entered racehorses in a paddock are presented together. For a certain race, a checkpoint list display 55 is presented as points to check. The checkpoint list display 55 indicates which points to pay attention to on how each entered racehorse behaves and is in the paddock. A user can understand each horse's feature by referring to this checkpoint list display 55, and then watches paddock moving image or actually observes in the paddock of a racetrack to make predictions.

Although the above FIGS. 6, 7, 8A and 8B are merely examples, it is possible that as images provided by the assist information server according to the present embodiments, an attention point is displayed at a predetermined position on a web page.

For example, the checkpoint list display 55 shown in FIG. 8B may be added to a racecard page, an odds page, a race analysis page, and other pages.

Alternatively, as in FIG. 8A, the points to check 53 may be displayed along with the paddock moving image 51.

Alternatively, as shown in FIGS. 6 and 7, the attention point displays 50 and 50V may be superimposed on a paddock moving image. In another aspect of these, only the attention point may be indicated.

Moreover, as with these, not only is the attention point presented, but differences (differences between images) identified when a good racing result is obtained and differences (differences between images) identified when a bad racing result is obtained may also be distinguishably presented. That is, how the attention point is in good condition (or in bad condition) may be displayed so as to be understood by users.

In the examples of FIGS. 6, 7, and 8A, both how the attention points are in "good" condition and how the attention points are in "bad" condition are described using text. Alternatively, only one of them may be described.

For more concise presentation, good condition and bad condition may be distinguishably displayed using marks, symbols, graphics, colors, or the like.

For example, when a certain attention point is in good condition, an image in which a blue circle is superimposed on the attention point may be displayed. When the attention point is in bad condition, an image in which a red circle (or a predetermined symbol or mark, such as "X") is superimposed on the attention point may be displayed. These images enable users to notice whether the condition is good or bad.

Furthermore, there is a possible way of displaying images that indicate a difference between good condition and bad condition. For example, if an image indicating a neck angle in good condition and an images indicating a neck angle in bad condition are presented side by side, users can easily notice the difference.

Presentation information including these attention points may be provided on a web page. Alternatively, presentation information such as images or text may be sent to the user terminal by email or a predetermined messaging function.

3. Registration Process

The following describes processes performed by the assist information server 2 according to the present embodiments. First, DB registration processes that the assist information server 2 performs as needed to present information as first to third embodiments, which will be described later, is now described.

FIGS. 9 to 15, referred to below, show processes in the user terminal 5, the assist information server 2, and the competition information server 3, and also show how the assist information server 2 accesses the user DB 11, the prediction/purchase information DB 13, the racing information DB 12, and the pre-race movement DB 14.

FIG. 9 shows a process for registering user information in the user DB 11. In FIG. 9, the process in the assist information server 2 is performed mainly by the functions as the communication controller 2a, the presentation controller 2g, the information retriever 2e, and the DB access unit 2f.

In response to a user's operation, the user terminal 5 accesses the horse racing site provided by the assist information server 2 and makes a request for viewing various page information (Step S101).

In response to this, the assist information server 2 sends requested page information in Step S201. This enables the user, who is using the user terminal 5, to view various pages as the horse racing site.

For example, users can sign up for the horse racing site. For example, the users may be required to sign up to purchase horse betting tickets and post prediction information.

A user who wishes to sign up requests a registration information entry page, for example, as the page information request made in Step S101. In response to this, the assist information server 2 sends the registration information entry page to the user terminal 5 (S201).

The user, who has viewed the entry page on the user terminal 5, enters information required for the entry page, such as the user's password, name, age, gender, and address, and then performs an operation to send the information as a registration request. Thus, in Step S102, the user information and the registration request are sent from the user terminal 5 to the assist information server 2.

When receiving this, the assist information server 2 registers the user information in Step S202. That is, the assist information server 2 assigns a user ID and also performs a process for registering such user information as shown in FIG. 4A in the user DB 11, based on the sent user information.

The user, who has signed up in this manner, accesses the horse racing site provided by the assist information server 2 and logs in to the site, for example, with the user's password to receive richer services than unregistered users. For example, purchase of horse betting tickets and various posts on the horse racing site become available.

Although not shown, when a registered user has posted prediction information or has purchased horse betting tickets, the assist information server 2 registers, as history information about it, such prediction information or purchase information as shown in FIG. 5 in the prediction/purchase information DB 13.

FIG. 10 shows a process for registration in the racing information DB 12. In FIG. 10, the process in the assist information server 2 is performed mainly by the functions as the communication controller 2a, the image obtainer 2b, the information retriever 2e, and the DB access unit 2f.

The assist information server 2 performs Steps S210 to S213 irregularly one by one, regularly, or in response to a predetermined trigger (e.g., a notification of a new information generation or an update from the competition information server 3).

In Step S210, the assist information server 2 sends a racing information request to the competition information server 3. For example, the assist information server 2 specifies one or more races yet to be stored in the racing information DB 12 and requests racing information about those race(s).

In response to this, in Step S301, the competition information server 3 retrieves racing information about the specified race(s) from the competition DB 8 and sends the racing information to the assist information server 2.

In Step S211, the assist information server 2, which has received the racing information, performs a process for registering information for one race in the racing information DB 12 using the received racing information. For example, the assist information server 2 forms, for one race, such an information group as shown in FIG. 4B. However, when the racing information request in Step S210 is made for a race yet to be held, information about the corresponding racing results is, of course, not included.

There may be a case where racing information about a registered race is changed. Thus, in Step S210, the assist information server 2 may further request, to the competition information server 3, racing information about a race updated after receiving the previous racing information.

In Step S212, the assist information server 2 sends a racing result request to the competition information server 3. For example, the assist information server 2 specifies one or more races whose racing results are not stored in the racing information DB 12 and that a predetermined period of time or more has elapsed since the corresponding post time on the race date (i.e., that have been already finished), and requests racing result information about those race(s).

In response to this, in Step S302, the competition information server 3 retrieves racing result information about the specified race(s) from the competition DB 8 and sends the racing result information to the assist information server 2.

In Step S213, the assist information server 2, which has received the racing result information, updates the stored information about the corresponding race so that the received racing result information is added to the racing information DB 12. Thus, such an information group as shown in FIG. 4B is formed for one race.

Registration of images in the pre-race movement DB 14 is not shown but is performed as needed. When performing a relay broadcast of a paddock or a race in real time, the horse racing site performs, for example, a process for importing images captured by the image-capturing device 6 as needed and for streaming them to the user terminal 5, or a process for downloading the images from the image DB 9 and for providing them to the user terminal 5.

That is, on a horse race date, paddock moving images and racing moving images as image data are once provided from the sending device 7 and the competition information server 3, and thus the image data is registered in association with a race ID in the pre-race movement DB 14.

Information about an attention point of each racehorse entered in the race is registered in the pre-race movement DB 14, in a process to be described later.

4. First Embodiment

Figure 11:
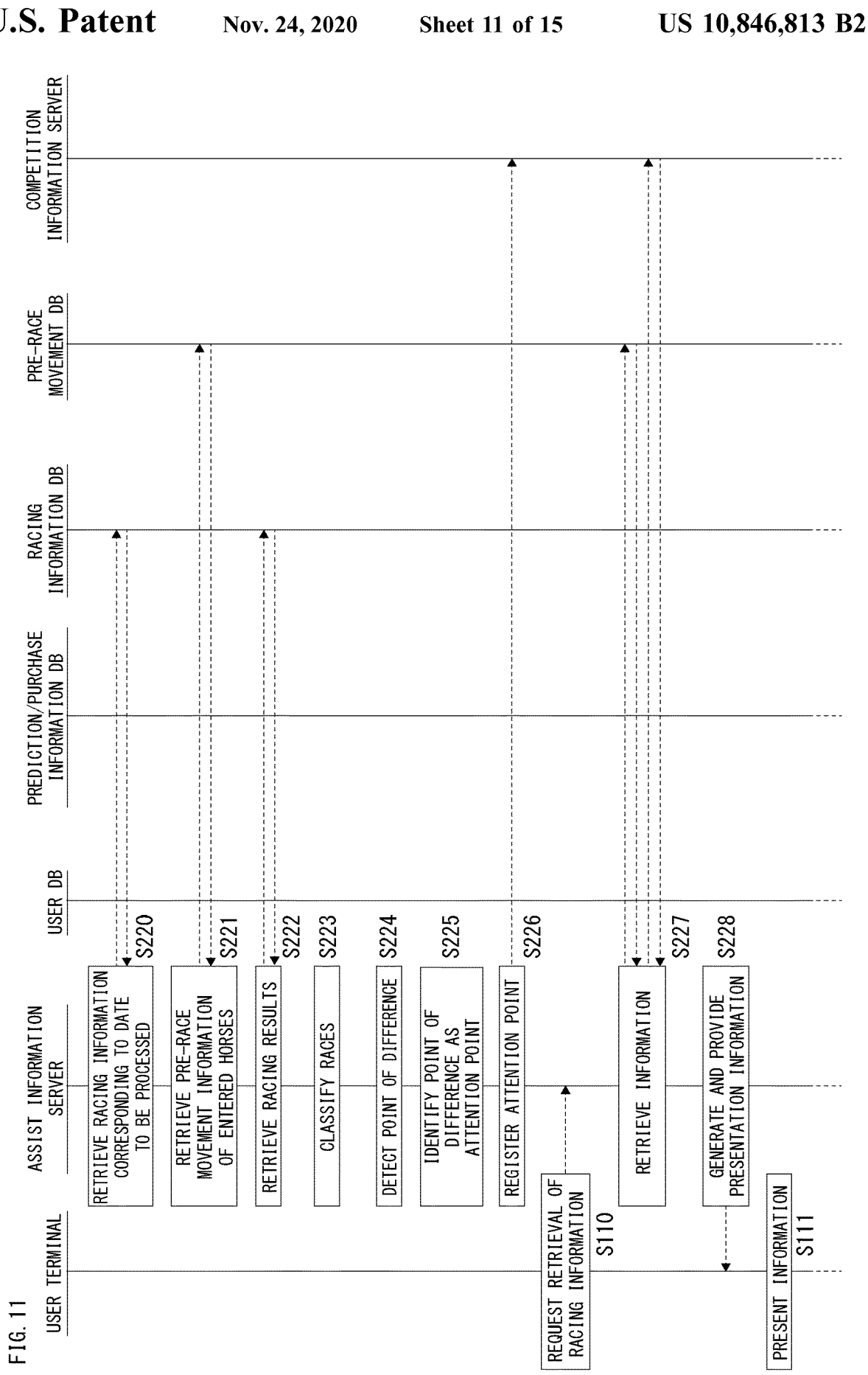
FIG. 11 is a flowchart of a first embodiment.

A first embodiment is described with reference to FIG. 11. In the first embodiment, the assist information server 2 performs a process for presenting an attention point to assist a user who is watching paddock moving images. In FIG. 11, the process in the assist information server 2 is performed mainly by the functions as the communication controller 2a, the attention point identification unit 2c, the racer identification unit 2d, the DB access unit 2f, and the presentation controller 2g.

The process of FIG. 11 is an example where the assist information server 2 performs Steps S220 to S226 in advance and then performs Steps S227 and S228 in response to a request from the user terminal 5.

In Step S220, the assist information server 2 accesses the racing information DB 12 and retrieves racing information corresponding to a date to be processed. For example, assuming that a race scheduled to be held a week later is to be processed, the assist information server 2 retrieves racing information about the race to be held a week later. The retrieved racing information includes at least a race ID and entered horse information. Through this process, the assist information server 2 identifies racehorse(s) entered in the race (race ID) to be processed.

The race IDs and entered horse information of a plurality of races scheduled to be held a week later may be retrieved together.

In Step S221, the assist information server 2 retrieves pre-race movement information for all or some of the horses entered in the race identified by the corresponding race ID. This is a process for reading, for the corresponding racehorse, paddock moving image data of a plurality of past races from the pre-race movement DB 14.

That is, for one racehorse, paddock moving images of the plurality of races in which the racehorse entered are collected from the pre-race movement DB 14. The assist information server 2 thus reads paddock moving image data for one or more racehorses to be processed.

In Step S222, using the race ID corresponding to each piece of paddock moving image data read in Step S221, the assist information server 2 retrieves, from the racing information DB 12, the racing result information corresponding to each piece of paddock moving image data, that is, result information about the race held just after each paddock moving image was captured.

In Step S223, the assist information server 2 classifies the races. This is a process for extracting "paddock images captured when a good result was obtained" and "paddock images captured when a bad result was obtained" from among the plurality of past paddock images of the racehorse (s) to be processed, by referring to the racing result information associated with the race ID.

This classifies some of the pieces of past paddock moving image data as "paddock images captured when a good result was obtained" and classifies some of the pieces of past paddock moving image data as "paddock images captured when a bad result was obtained", for one of the racehorse(s) to be processed. A past paddock moving image may be always classified as either a "paddock image captured when a good result was obtained" or a "paddock image captured when a bad result was obtained". Alternatively, to find a more definite point of difference, paddock moving image data of a race in which a moderate result was obtained may not be classified as any type.

The assist information server 2 performs such a classification process for each of the racehorse(s) to be processed.

Whether a result is good or bad may be evaluated based on relative racing results such as placings or on absolute racing results such as race times.

When racing results are relatively evaluated, it is possible that, for example, a paddock image of a race that a racehorse to be processed finished in the top four is classified (extracted) as a "paddock image captured when a good result was obtained" and that, for example, a paddock image of a race that the racehorse finished in the bottom four is classified (extracted) as a "paddock image captured when a bad result was obtained".

Alternatively, a place that is above the racehorse's average place may be classified as a "good result", and a place that is below the average place may be classified as a "bad result". This makes it possible to determine whether a "good result" or a "bad result" was obtained, also for racehorses that always complete for higher places and racehorses that always finish in lower places.

When racing results are absolutely evaluated, it is possible that, for example, a paddock image of a race in which a racehorse to be processed made a race time faster than a first reference race time is classified as a "paddock image captured when a good result was obtained" and that a paddock image of a race in which the racehorse made a race time later than a second reference race time is classified as a "paddock image captured when a bad result was obtained". The first and second reference race times may be the same. A standard race time depends on the type and the distance of a track. Thus, it is preferable that the first and second reference race times be set for each race.

In Step S224, the assist information server 2 detects a point of difference for each racehorse to be processed. This is a process for comparing one or more paddock images captured when a good result was obtained with one or more paddock images captured when a bad result was obtained and for detecting a point of difference in the condition and movements of each racehorse. The point of difference is detected by comparing paddock still images and by comparing paddock moving images.

As described above, the assist information server 2 compares, for example, the angle of the racehorse's neck, the angle of its ears, how its tongue was, how its eyes were, and where the racehorse walked, for example, between a paddock still image captured when a good result was obtained and a paddock still image captured when a bad result was obtained, and searches for differences between the still images.

The assist information server 2 also compares, for example, how many times or how often the racehorse swung its head, how many times or how often the racehorse swung its tail, how the racehorse tends to walk, its walking speed in the paddock, and its stride in the paddock, for example, between a paddock moving image captured when a good result was obtained and a paddock moving image captured when a bad result was obtained, and searches for differences between the moving images.

It is possible that these points of difference are detected by analyzing each paddock image to convert each comparison item into numbers, by calculating the differences between the numbers (the average values, the median values, the minimum values, or the maximum values) for good results and the numbers (the average values, the median values, the minimum values, or the maximum values) for bad results, and by identifying comparison items whose difference is greater than a predetermined value as the points of difference. Of course, the predetermined value to be compared with each difference may be set for each comparison item.

Alternatively, from among the items that vary greatly as compared with other parts, regions, places, or the like, an item at which a difference exists between when a good result was obtained and when a bad result was obtained may be identified as the point of difference.

Specific examples of a process for detecting a point of difference are shown.

In the first example, for a racehorse to be processed, a paddock image captured when a good result was obtained and a paddock image captured when a bad result was obtained are compared, and a comparison item that varies greatly is identified as a point of difference.

Example 1

Its "neck", which is different in shape (angle) of at least a predetermined angle between a paddock image of the third race on October 3 included in "paddock images captured when a good result was obtained" and a paddock image of the fifth race on November 7 included in "paddock images captured when a bad result was obtained", is identified as a point of difference.

Example 2

Features common to 100 paddock images of a plurality of races, such as a paddock image of the sixth race on September 10 and a paddock image of the first race on November 21 that are included in "paddock images captured when a good result was obtained", are detected. Feature common to 100 paddock images of a plurality of races, such as a paddock image of the first race on August 10 and a paddock image of the first race on October 11 that are included in "paddock images captured when a bad result was obtained", are also detected. Then, each common feature is converted into numbers and compared. Its "ears", whose numerical difference is greater than a predetermined value, are identified as a point of difference.

The next example focuses on the range of variation. For a racehorse to be processed, a plurality of paddock images (still images) of the same race are compared, and which parts of the racehorse vary greatly is identified from the paddock images. In the example, the ranges of variation degree of the identified parts are compared between paddock images of a plurality of different races, and a part whose range of variation degree of the racehorse included in the paddock images is large is identified as a point of difference.

Example 3

Its "tail" is identified as a part that varies greatly between 100 (100 frames of) paddock still images of the third race on October 3 included in "paddock images captured when a good result was obtained". Then, the range of variation of its "tail" is compared with the range of variation between 100 paddock images (still images) of the seventh race on October 10 and the range of variation between 120 paddock images of the first race on November 21. If the range of variation degree is large, the "tail" is identified as a point of difference.

Example 4

For a specific item such as "the range of up-down sway of its body", the range of variation between 100 (100 frames of) paddock still images of the third race on October 3 included in "paddock images captured when a good result was obtained" is converted into numbers. Then, the "range of up-down sway of its body" is compared with the value based on the 100 paddock images (still images) of the seventh race on October 10 and the value based on the 120 paddock images of the first race on November 21. If the range of variation degree is large, the "range of up-down sway of its body" is identified as a point of difference.

In the above examples, a point of difference of a racehorse is all detected from a plurality of paddock images of different races in which the same racehorse appears. However, it is possible that a plurality of paddock images of the same race in which different racehorses (e.g., horses A and B) appear are compared and that parts whose variation among the racehorses is large are paid attention to.

For example, among racehorses in the same race, tendencies of horses that produced a good result and tendencies of horses that produced a bad result are analyzed. As a specific example, for example, assume from past paddock moving images that racehorses that walk near the inside of the paddock produced a relatively good result and that racehorses that walk near the outside of the paddock produced a relatively bad result. A point of difference may be identified by comparing such analyses with the condition of each racehorse.

Possible examples of a process for grabbing still image data (one frame) from moving image data when comparing still images to search for a points of difference is as follows:
- Grab all frames included in the moving image
- Grab each frame in which an object changes, from among all the frames included in the moving image
- Grab frames at predetermined positions, from among all the frames included in the moving image
- Grab frames at predetermined intervals, from among all the frames included in the moving image
- Grab frames that have a shape similar to a predetermined shape After detecting a point of difference in the above Step S224, the assist information server 2 identifies an attention point for each racehorse in Step S225. For example, assume here that all of the one or plurality of points of difference detected for a racehorse in Step S224 are identified as attention points for the racehorse. This process is performed for each racehorse to identify an attention point of the racehorse.

In Step S226, the assist information server 2 performs a process for registering information about the attention point identified for each racehorse to be processed in the pre-race movement DB 14.

As described with reference to FIG. 5B, the pre-race movement DB 14 stores, in association with each race ID, the attention point of all or some of the racehorses entered in the corresponding race. For example, in the above Steps S220 to S226, a race to be processed is set, racehorses entered in the race are identified, and an attention point is identified and registered for all the racehorses to be processed. Consequently, the attention point of each racehorse entered in the race are stored in the pre-race movement DB 14.

Attention points of all racehorses entered in a race need not necessarily be stored in the pre-race movement DB 14. Attention points for each entered racehorse may be sequentially registered in response to identification of the points.

It is desirable that the information about the attention point further include information about how the point of difference identified as the attention point is in "good" condition and how the point of difference is in "bad" condition and be stored with the attention point in the pre-race movement DB 14.

Differences in the condition between when a "good result" was obtained and when a "bad result" was obtained can be understood in Step S224. Thus, information corresponding to the condition may be generated as text data, numerical data, or images, and be further stored as part of attention point information in the pre-race movement DB 14.

When attention point information of an entered horse is registered in association with a race ID in the pre-race movement DB 14, the attention point information of a specific racehorse may have been stored also in association with another race ID.

However, a point of difference corresponding to good and bad results of the racehorse can gradually change, and the accuracy will improve as the number of paddock images to be samples increases. Thus, it is preferable that Steps S220 to S226 be performed for each race and that attention point information of each entered horse be newly identified and registered.

In particular, when Steps S220 to S226 have not been completed for a race or a racehorse, attention point information of the latest race may be registered in the pre-race movement DB 14 as a default in association with the race ID of a coming race ID, and the registered information may be updated every time an attention point is newly identified in Steps S220 to S226.

After the above Steps S220 to S226 are completed, the assist information server 2 can provide information for assisting a user in making predictions in response to a request from the user terminal 5.

When the user terminal 5 sends a request for retrieval of racing information in response to a user operation in Step S110, the assist information server 2 performs the process corresponding to the request.

The request for retrieval of racing information from the user terminal 5 is a request that includes the race ID of a race specified by the user and that is made to view a web page for information about the race, such as entered horses, odds, and paddock images.

In response to this, the assist information server 2 retrieves the racing information relating to the specified race ID from the racing information DB 12 in Step S227. The assist information server 2 also retrieves at least an attention point for the specified race ID and further retrieves image data when images are displayed, from the pre-race movement DB 14.

In Step S228, the assist information server 2 generates presentation information using the retrieved racing information and attention point, and sends the presentation information to the user terminal 5. For example, the assist information server 2 generates page data (e.g., page data written in hypertext markup language (HTML)) for the web page requested from the user terminal 5 and sends the page data to the user terminal 5. This presentation information includes information about an attention point of a racehorse entered in the corresponding race. Specifically, it is information to cause the user terminal 5 to display as illustrated in FIGS. 6, 7, 8A, and 8B.

In Step S111, the user terminal 5 presents the presentation information sent from the assist information server 2. For example, such a screen as illustrated in FIG. 6, 7, 8A, or 8B is displayed, and points to pay attention to while the user is watching paddock moving images for all or some of the racehorses entered in the corresponding race are presented to the user.

It is possible in Step S228 that the assist information server 2 sends the presentation information to the user terminal 5 to provide the user with it in a format other than a web page, for example, by e-mail.

The process of FIG. 11 enables the assist information server 2 to provide, in response to a user's request, information including an attention point of an entered racehorse in a paddock to the user, thus assisting the user in making placing predictions and purchasing horse betting tickets.

Paddock image data may be retrieved from the pre-race movement DB 14 in Step S221 or "paddock images captured when a good result was obtained" and "paddock images captured when a bad result was obtained" may be extracted in Step S223, based on the following narrowing criteria.

A possible narrowing criteria for paddock images is that only paddock moving images of races that match the racing conditions (e.g., track conditions, racing grade, racing distance, course type, racetrack, weather, temperature, and jockeys) of a race to be processed are retrieved or extracted. Such examples include paddock moving images of past races that are similar in racing conditions to the race to be processed.

Specifically, possible examples are as follows.

Only paddock images of races that were held in the same racetrack (e.g., OO Racetrack) and have the same distance (e.g., 1,500 m) as the race to be processed are retrieved or extracted.

Only paddock images of races that had the same track conditions (e.g., good), have the same course type (e.g., turf course), and have the same distance (e.g., 1,500 m) as the race to be processed are retrieved or extracted.

The following criteria may be further added:

Past races in which the same jockey for a racehorse to be processed ran as in the race to be processed Past races that were held around the same time as the race to be processed Past races that were held under similar climate conditions (e.g., weather, temperature, and humidity) to the race to be processed Past races that have the same racing type or rank as the race to be processed Another possible narrowing criteria for paddock images is that, by referring to the racer information, only paddock moving images of races that match the condition (weight, the range of variation in weight, and intervals between races) of a racer (racehorse) in the race to be processed and the condition indicated by the racer information are retrieved or extracted. Such examples include paddock moving images of past races in which a racehorse was in a condition similar to the condition of the racehorse in the race to be processed.

Specifically, possible examples are as follows.

Only paddock images of races in which the racehorse to be processed weighed its current weight +/−10 kg are retrieved or extracted.

Only paddock images of races in which the racehorse to be processed weighed its weight in the previous race +10 to +20 kg (the range of variation in weight) are retrieved or extracted.

Only paddock images of races that were held seven or more days after a previous race are retrieved or extracted.

Still another possible narrowing criteria is the AND combination or OR combination of the narrowing criteria of matching the above racing conditions and the narrowing criteria of matching the racer information.

These criteria for paddock images on which identification of an attention point is based ensures similarities between races or racers that are related to the race to be processed and allows an attention point to be identified based on "paddock images captured when a good result was obtained" and "paddock images captured when a bad result was obtained", thus increasing the possibility that a more effective attention point, that is, an attention point to be more effective information for making placing predictions is presented.

The above process of FIG. 11 is an example where the assist information server 2 performs Steps S220 to S226 in advance and then performs Steps S227 and S228 in response to a request from the user terminal 5. Alternatively, the assist information server 2 may perform steps corresponding to Steps S220 to S226 in real time in response to the request from the user terminal 5.

Figure 12:
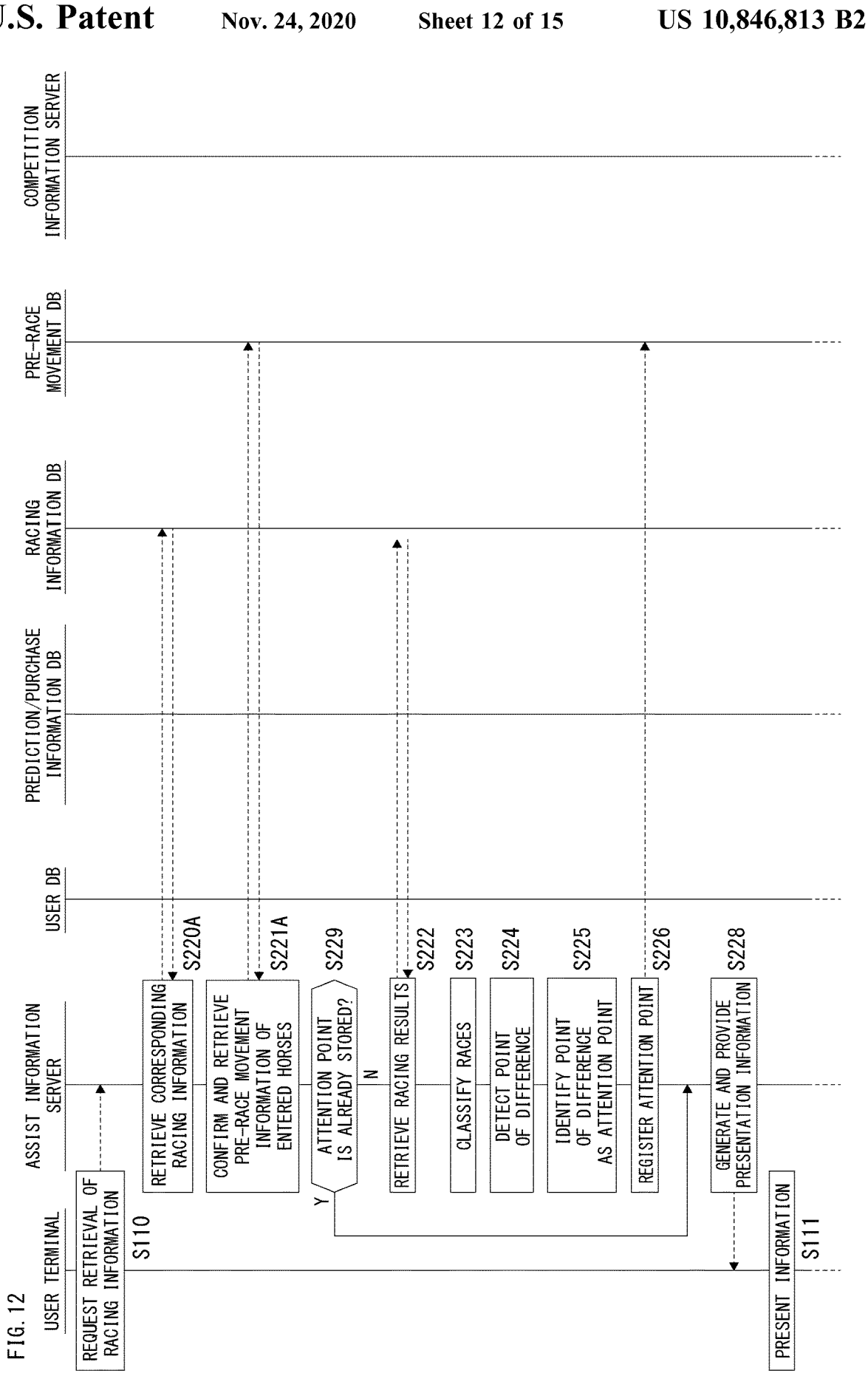
FIG. 12 is a flowchart of a modification of the first embodiment.

FIG. 12 shows an example process performed in that case.

The request for retrieval of racing information from the user terminal 5 in Step S110 triggers the assist information server 2 to perform the process.

When receiving the request for retrieval of racing information from the user terminal 5, the assist information server 2 retrieves racing information about the corresponding race from the racing information DB 13 in Step S220A. In this case, the retrieval request from the user terminal 5 includes information that specifies a race about which information is requested, and the assist information server 2 retrieves racing information about the race. Through this process, the assist information server 2 identifies racehorses entered in the race (race ID) to be processed that is specified from the user terminal 5.

In Step S221A, the assist information server 2 confirms pre-race movement information for all or some of the racehorses entered in the race identified by the corresponding race ID and retrieves the pre-race movement information as needed.

When a user has specified a racehorse about which information is requested among the racehorses entered in the race to be processed, that is, when a racehorse is specified in the request for retrieval of racing information, the assist information server 2 only needs to determine the racehorse to be processed. Alternatively, even when the user has not specified any racehorse, the assist information server 2 may select popular racehorses from among the entered racehorses, for example, based on odds and determine some of the entered racehorses to be processed to present an attention point. Of course, all the entered horses may be determined to be processed. However, for a real-time process, a possible way to reduce the load of processing is that racehorses to be processed are limited to some of the racehorses entered in the corresponding race.

Confirmation of the pre-race movement information in this Step S221A is to confirm whether information about anattention point of the racehorse(s) to be processed is already stored in association with the corresponding race ID in the pre-race movement DB 14. This is because there may be a case where Steps S222 to S226 have been performed for all or some of the racehorses in response to a request for retrieval of racing information from another user terminal 5 and information about the attention point is already stored.

If it is confirmed that information about the attention point of the racehorse(s) to be processed is already stored in association with the race ID to be processed, the assist information server 2 causes the process to proceed from Step S229 to Step S228.

If it is confirmed that information about the attention point of the racehorse(s) to be processed is not stored in association with the race ID to be processed, the assist information server 2 retrieves paddock moving image data of a plurality of past races that the corresponding racehorse(s) entered from the pre-race movement DB 14 and causes the process to proceed from Step S229 to Step S222. In this case, in Steps S222 to S226, the assist information server 2 performs the same steps as those described with reference to FIG. 11, identifies an attention point for the racehorse(s) to be processed, and registers the attention point in the pre-race movement DB 14.

In Step S228, the assist information server 2 generates presentation information using the racing information retrieved in Step S220A and the attention point identified in Step S225 (or the attention point already stored and retrieved in Step S221A) and sends the presentation information to the user terminal 5.

In Step S111, the user terminal 5 presents the presentation information sent from the assist information server 2. For example, such a screen as illustrated in FIG. 6, 7, 8A, or 8B is displayed.

The above real-time process also makes it possible to provide information appropriate to a user's observation in a paddock.

In the process of FIG. 12, Steps S222 to S226 need not be performed if the attention point for the racehorse(s) to be processed is already stored in Step S229. However, Steps S222 to S226 may be performed again.

For example, this is because a racehorse that a user has specified is paid attention to by the user, and thus attention point except the stored attention point may be further identified. In the third embodiment to be described later, an example where the number of settable attention points is changed based on a "possibility of being selected" will be described. However, the "possibility of being selected" may depend on who uses. Thus, in some cases, an attention point identified and registered in response to another user's request are not good enough. In view of such a situation, Steps S222 to S226 may always be performed.

5. Second Embodiment

Figure 13:
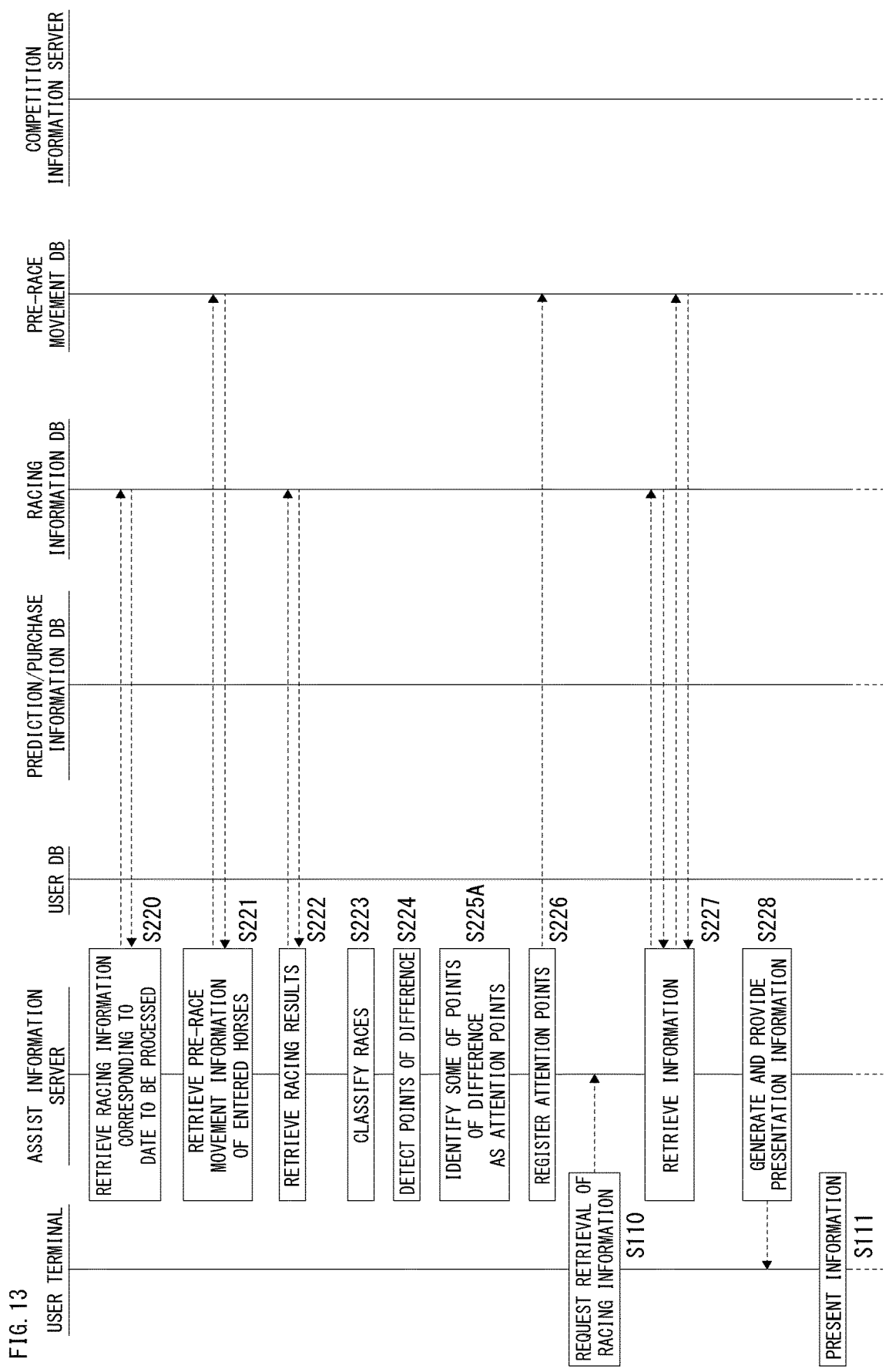
FIG. 13 is a flowchart of a second embodiment.

An example process according to the second embodiment is now described with reference to FIG. 13. The same steps as in FIG. 11 are denoted by the same step numbers, and the description is not repeated here. This second embodiment differs from the first embodiment in Step S225 performed by the assist information server 2.

That is, after detecting a plurality of points of difference for one or more racehorses to be processed in Step S224, the assist information server 2 identifies not all the items detected as the points of difference but some of the items as attention point(s).

Specifically, the assist information server 2 preferentially identifies, from among the points of difference detected for the racehorse(s) to be processed, an item that shows a relatively large degree of difference (change) compared with other items, as an attention point.

For example, assume that for a racehorse, "the angel of its neck", "where the racehorse walked", and "how many times the racehorse swung its tail" are detected as points of difference. Further assuming that the difference values of the items determined to be the points of difference are "1: how many times the racehorse swung its tail", "2: where the racehorse walked", and "3: the angle of its neck" in descending order of the difference with respect to a predetermined value that is a comparison reference for determination (in descending order of the degree of difference), only "how many times the racehorse swung its tail" is identified as an attention point. Alternatively, "how many times the racehorse swung its tail" and "where the racehorse walked", two, may be identified as attention points.

Thus preferentially identifying an item that show a large degree of difference (change) as an attention point can prevent too many and rather confusing attention points from being excessively presented to a user.

Some points of difference are not just selected, but some points of difference that have a large degree of difference are selected as attention points. Consequently, items whose differences are easy for the user to notice on paddock images can be presented, thus allowing the user to easily notice how the racehorse is. For example, an attention point whose difference is too subtle for the user to notice can be eliminated.

In Step S225A, after identifying a plurality of attention points, the assist information server 2 may assign relative priorities to the plurality of attention points. For example, all points of difference are registered as attention points with priorities assigned to them. However, when information about the attention points is actually provided to the user terminal 5, the attention points that are in the top n priorities are provided to the user terminal 5. That is, the number n may be variably set based on various types of conditions, operations, and selections by the user.

When some of the plurality of points of difference are selected as attention points, there are various possible ways to determine which item of the detected points of difference to select as the attention point.

For example, a priority may be preassigned to each comparison item for examining whether it is a point of difference. For example, a visually noticeable item is assigned a higher priority. Specifically, the angle of a racehorse's neck, the angle of its ears, where the racehorse walked, how many times or how often the racehorse swung its head, how many times or how often the racehorse swung its tail, and the like, which are easy to notice, are assigned higher priorities. How its tongue is, how its eyes are, its walking speed, its stride, and the like, which are difficult to notice, are assigned lower priorities. Among the detected points of difference, the items that are in the top n priorities are selected as attention points.

Alternatively, which items to assign higher priorities to may be preset for each individual racehorse. For example, for a horse A that showed a large degree of change in "the angle of its neck", the priority of "the angle of its neck" is set higher. On the other hand, for a horse B that showed little change in "the angle of its neck", the priority of "the angle of its neck" is set lower.

6. Third Embodiment

An example process according to the third embodiment is now described with reference to FIGS. 14 and 15. The same steps as in FIG. 11 are denoted by the same step numbers, and the description is not repeated here. This third embodiment is an example where in view of the possibility of being a prediction target, a different number of attention points are selected for each entered racehorse.

Figure 14:
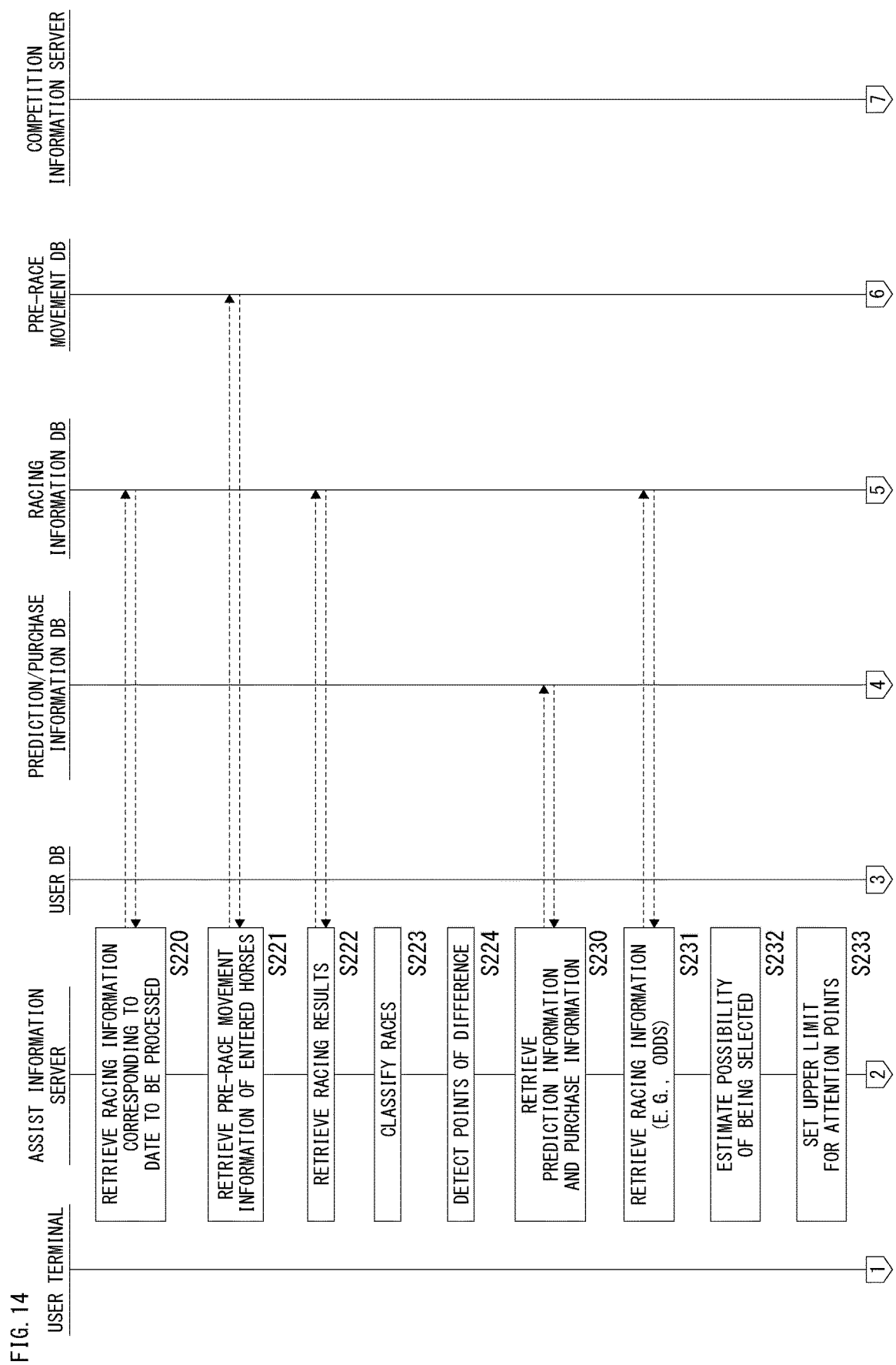
FIG. 14 is a flowchart of a third embodiment.

Steps S220 to S224 shown in FIG. 14, which are performed by the assist information server 2, are the same as those in FIG. 11.

For a race to be processed, after detecting, in Step S224, a point of difference for one or more racehorses to be processed, the assist information server 2 retrieves prediction information and purchase information about the race from the prediction/purchase information DB 1213 in Step S230.

In this case, the assist information server 2 may retrieve prediction information and purchase information in past races, which are intended for each entered racehorse.

In Step S231, the assist information server 2 retrieves required information, such as the odds for and the best time of each racehorse entered in the corresponding race, from the racing information DB 12.

Both of these Steps S230 and S231 may be performed, or only one of them may be performed.

In Step S232, the assist information server 2 performs a process for estimating a possibility of being selected, for each racehorse entered in the race to be processed. The possibility of being selected is an expected value indicating how likely the racehorse is to be a target for making placing predictions or a target for purchasing horse betting tickets, for a large number of users. For example, popular horses and horses that complete for higher places (e.g., the favorite and a rival horse) are estimated to have strong possibilities of being selected.

When horses that complete for higher places are estimated to have strong possibilities of being selected, the possibilities are estimated specifically as follows:

Racehorses given higher odds (higher odds have a smaller value) and racehorses given similar odds Racehorses having a higher best time (a higher best time has a smaller value) and racehorses having a similar best time Racehorses having a higher number of predictions (a higher number of predictions has a larger value) and racehorses having a similar number of predictions These racehorses can be evaluated to have strong possibilities of being selected. Thus, using a value indicating how likely a predicted place is to be higher that is obtained based on these criteria, the possibility of each racehorse being selected can be determined (e.g., the possibility of being selected is classified as strong, medium, or remote) or converted into numbers.

Examples of the value indicating how likely a predicted place is to be higher include the difference value between the above odds, the difference value between best times, and the difference value between the numbers of predictions.

Racehorses that are included in the current prediction information of a user (a tipster or a horse bettor) are also estimated to have strong possibilities of being selected.

For example, one or more pieces of prediction information about the race to be processed which were posted by the user are checked. Racehorses that appear in the piece(s) of prediction information (or racehorses that are predicted to be in higher places) are considered to be racehorses about which information many users wish to know and can be evaluated to have strong possibilities of being selected.

Thus, based on the number of appearances of each racehorse in the piece(s) of prediction information (or the number of predictions of winning a higher place), the possibility of each racehorse being selected can be determined and converted into numbers.

When piece(s) of prediction information are thus used to estimate a possibility of being selected, the following ways are possible.

Pieces of prediction information about the race that were posted by all users is used.

From among the pieces of prediction information about the race, pieces of prediction information posted by highly rated users and high-performing are selected and used.

Racehorses that are included in past predictions and purchases that were made by a user (a tipster or a horse bettor) are also estimated to have strong possibilities of being selected.

For example, among racehorses entered in a race to be processed, popular horses that were often prediction targets or targets for purchasing horse betting tickets in the past are considered to be racehorses about which information many users wish to know and can be evaluated to have strong possibilities of being selected. Thus, based on the number of past actual predictions and purchases for each racehorse, the possibility of each racehorse being selected can be determined and converted into numbers.

After estimating a possibility of being selected for each entered racehorse, for example, from the above viewpoint, the assist information server 2 sets an upper limit for the number of attention points for each racehorse in Step S233.

This is set based on a rank or a numerical value as the possibility of being selected estimated for each of the racehorses. That is, a greater upper limit is set for a racehorse that have a stronger possibility of being selected.

Subsequently, in Step S234 shown in FIG. 15, the assist information server 2 identifies, for each racehorse, all or some of the extracted points of difference detected in Step S224 as attention points so that the number of attention points of each racehorse is less than or equal to the set upper limit. For example, if the upper limit "3" is set for a racehorse that has five items of points of difference, three of the items are identified as the racehorse's attention points.

When the number of points of difference exceeds the upper limit, it is preferable that which of the points of difference to identify as an attention point be determined using the idea of the priorities described in the second embodiment.

In Step S235, the assist information server 2 performs a process for registering information about one or more attention points identified for each racehorse to be processed, the number of which is less than or equal to the corresponding upper limit, in the pre-race movement DB 14.

After the above Steps S220 to S235 are completed, the assist information server 2 can provide information for assisting a user in making predictions in response to a request from the user terminal 5.

When a request for retrieval of racing information is sent form the user terminal 5 in Step S110, the assist information server 2 retrieves the racing information relating to the specified race ID from the racing information DB 12 in Step S237. The assist information server 2 also retrieves at least an attention point for the specified race ID and further retrieves image data when images are displayed, from the pre-race movement DB 14.

In Step S238, the assist information server 2 generates presentation information using the retrieved racing information and an attention point, and sends the presentation information to the user terminal 5.

In Step S111, the user terminal 5 presents the presentation information sent from the assist information server 2. For example, such a screen as illustrated in FIG. 6, 7, 8A, or 8B is displayed, and points to pay attention to while the user is watching paddock moving images for all or some of the racehorses entered in the corresponding race are presented to the user. In this case, the number of presented attention points is increased for a horse with which the user is more likely to be concerned, and the number of presented attention points is reduced for an unpopular horse or a horse that has received little attention.

The racing information (e.g., odds) is subject to change before the corresponding race starts. When, for example, each user posts prediction information or purchases a horse betting ticket, the prediction information or the purchase information stored in the prediction/purchase information DB 13 are added or updated before the corresponding race.

Such an information update can lead to a situation where it is preferable to update the upper limit for the number of the attention points of each racehorse. Thus, the assist information server 2 also performs Step S240 and subsequent steps shown in FIG. 15.

When the prediction information or the purchase information is updated, the assist information server 2 retrieves the updated prediction information and purchase information of the corresponding race from the prediction/purchase information DB 13 in Step S240. In this case, the assist information server 2 may retrieve only the updated piece of prediction information or purchase information.

When the racing information (odds) is updated, the assist information server 2 retrieves the updated racing information of the corresponding race from the racing information DB 1312 in Step S241. In this case, the assist information server 2 may retrieve only the updated piece of racing information (odds).

When receiving the information thus updated, the assist information server 2 estimates the possibility of each entered racehorse being selected, based on the updated racing information (odds), or on the updated prediction information and purchase information, in Step S242. That is, the assist information server 2 re-estimates the possibilities of being selected.

In this case, the assist information server 2 may re-estimate the possibility of being selected only for racehorses about which racing information (odds), or prediction information and purchase information has been updated.

In Step S243, the assist information server 2 updates the upper limit of the number of attention points of each entered horse, based on the re-estimated possibilities of being selected. In this case, the assist information server 2 may update the upper limit only for racehorses whose possibility of being selected has changed.

In Step S244, the assist information server 2 resets the attention point of each racehorse, based on updated upper limits for the number of attention points. Of course, the assist information server 2 only need to perform this step only for racehorses for which upper limit has been changed.

For example, for a racehorse for which the upper limit has been increased, the assist information server 2 adds point(s) of difference that was not selected as its previous attention point (item) to the attention point. For a racehorse for which the upper limit has been reduced, the assist information server 2 excludes some of the items selected as its attention point from the attention points in order of increasing priority.

After resetting the attention point in this manner, the assist information server 2 updates the information corresponding to the race ID in question stored in the pre-race movement DB 14 with information about the updated attention point in Step S245. If Steps S243 and S244 result in no change in information about the attention point, Step S245 is unnecessary.

In Step S246, the assist information server 2 notifies the user terminal 5 to which the presentation information has already been sent that information about the attention point has just been updated.

The user terminal 5, which has received the notification, presents the update on its screen in Step S112 to inform the user of it.

In this case, the assist information server 2 may notify the user terminal 5 of the information update via what is called a push notification.

Through the above process shown in FIGS. 14 and 15, the more popular and high-visibility a racehorse is, information about the more attention points is presented to users. This provides users with information helpful in making predictions and purchasing horse betting tickets.

On the other hand, information provided about a horse that has received little attention is limited so as not to be felt confusing.

7. Summary and Modification

The embodiments described above produce the following effects.

The assist information server 2 that performs the processes of the first, second, and third embodiments includes the racer identification unit 2d, the attention point identification unit 2c, and the presentation controller 2g. The racer identification unit 2d identifies racers (racehorses) entered in a race to be processed. For each of all or some of the racers identified by the racer identification unit 2d, the attention point identification unit 2c retrieves a plurality of captured pre-race movement images of pre-race movements (e.g., a paddock walk) made by a racer before a race from the storage unit 10, and identifies an attention point to be paid attention to while pre-race movements are being made, by using the retrieved pre-race movement images and racing result information corresponding to each pre-race movement image. The presentation controller 2g generates presentation information for presenting information about the attention point identified by the attention point identification unit 2c. The presentation controller 2g then controls presentation of the presentation information on an external terminal (user terminal 5).

That is, an attention point for each racer (e.g., racehorse) are identified from racing result information corresponding to images of pre-race movements, such as paddock walks in horse racing. Presentation information including information about this attention point is provided to the user terminal 5. This can provide helpful information to be a guide for a user in watching paddock images and achieve a service capable of accurately assisting the user who is considering placing predictions or purchase of betting tickets.

In particular, presenting different attention points for each racehorse enables an inexperienced user to easily know how to observe each race horse in a paddock, which makes the user likely to be more interested in horse racing.

The attention point for each racehorse is identified based on the correlation between past paddock images and racing results, and thus are likely to be accurate information in observing a paddock to making placing predictions.

The information about an attention point provided by the assist information server 2 is helpful to a user who is observing paddock images as shown in FIG. 6, 7, or 8A. Such information as shown in FIG. 8B, which is provided to a user, is also helpful while the user is actually observing the paddock in a racetrack.

In the assist information server 2 according to the embodiments, the attention point identification unit 2c detects one or a plurality of candidate attention points (points of difference) to be paid attention to while each racer is making pre-race movements by using a plurality of past pre-race movement images and racing result information corresponding to each pre-race movement image (S224), and identifies all or some of the one or a plurality of candidate attention points as attention points to be included in presentation information (S225).

As in the first embodiment, identifying all of the point(s) of difference as attention point(s) makes a process for identifying an attention point simple.

On the other hand, as in the second embodiment, not presenting all of the points of difference detected as points to be paid attention to for each racer as "an attention point" to users but selecting information to be presented without setting an excessively large number of attention points can provide a service that is easy for users to use.

As a process for identifying an attention point for a racer, the attention point identification unit 2c extracts a type 1 pre-race movement image being a pre-race movement image of a race that ended in a good racing result (a paddock image captured when a good result was obtained) and a type 2 pre-race movement image being a pre-race movement image of a race that ended in a bad racing result (a paddock image captured when a bad result was obtained), from among a plurality of past pre-race movement images in which the corresponding racer appears, based on racing result information about a race corresponding to each pre-race movement image (S223), and identifies all or some of one or a plurality of points of difference (S224) identified based on a comparison between the type 1 pre-race movement image and the type 2 pre-race movement image as an attention point of the corresponding racer (S225, S225A).

To identify an attention point, pre-race movement images are classified as a type 1 pre-race movement image captured when a good result was obtained or a type 2 pre-race movement image captured when a bad result was obtained, and a point of difference of a racer is searched for by comparing these images. Consequently, the attention point become a point that has a high correlation with racing results, and information about the attention point can be provided as highly reliable points to check when making predictions or purchasing horse betting tickets.

In the second embodiment, the attention point identification unit 2c preferentially identifies, from among the identified points of difference, a point of difference that shows a relatively large degree of difference as compared with other points of difference as an attention point (S225A).

An attention point is information as a guide to which point users should pay attention to while watching pre-race movement images. Thus, it is helpful to select an item with a difference that is easy for the users to notice as the attention point. For example, by selecting a point of difference with a large degree of difference or a visually noticeable point of difference as an attention point, easily observable "an attention point" can be presented to users.

In the third embodiment, the attention point identification unit 2c performs, for each racer (racehorse), an estimation process for estimating a possibility of being selected that is a possibility that information provision will be requested (S232), sets an upper limit for the number of attention points so that more attention points are settable to a racer with a stronger estimated possibility of being selected (S233), and identifies, in a process for identifying an attention point for each racer, an attention point within the upper limit (S234).

Information requested by users is different in quality and quantity between a racer about which the users request little information and a high-visibility racer. Thus, an improved information service is achieved by increasing the number of attention points for a racer about which users are likely to request information.

In this case, the estimation process preferably estimates the possibility of being selected, using a value indicating how likely a predicted place is to be higher, thus estimating racers about which users are likely to request information and that are likely to compete for higher places.

It is possible that the estimation process estimates the possibility of being selected, using a user's current prediction information. This is because information about a racer that appears in a user's prediction information is likely to be requested.

It is possible that the estimation process estimates the possibility of being selected, using information about a user's past actual predictions or betting ticket purchases. This is because a racer with which many users are concerned and a popular racer can be estimated based on a user's actual predictions and purchases.

The presentation controller 2g of the assist information server 2 generates presentation information by which how each attention point is when a good racing result is obtained and how each attention point is when a bad racing result is obtained can be distinguished. For example, the presentation information causes such a screen as illustrated in FIG. 6, 7, 8A, or 8B to be displayed.

Presenting not just an attention point but information indicating how the attention point is in good condition or in bad condition makes the information more desirable to users.

If the attention point identification unit 2c performs a process for identifying an attention point, using pre-race movement images of a race that matches a race to be processed in racing conditions (e.g., turf or dirt, distance, and track conditions), a more appropriate attention point can be presented. This is because the behavior of a racer is possibly affected by racing conditions. Thus, use of past pre-race movement images captured under matched racing conditions will enhance the reliability of identifying an attention point of the racer in a race to be processed.

Also, if the attention point identification unit 2c performs, for each racer, a process for identifying an attention point, using pre-race movement images of a race having racer information that matches racer information (e.g., weight, and increase or decrease in weight) in a race to be processed, a more appropriate attention point can be presented. This is because the behavior of a racer is possibly affected also by the condition of the racer itself. Thus, use of past pre-race movement images with matched racer information will enhance the reliability of identifying an attention point of the racer.

The present invention is not limited to the examples of the embodiments. There are various possible example configurations and example processes as an information processing device that operates as the assist information server 2.

Although the example process of FIG. 12 is shown as a modification of the first embodiment, such a process can be, of course, applied to the process of the second or third embodiment.

The embodiments have been described assuming horse racing. However, the present invention can be, of course, applied not only to horse racing but also to other competitions, such as animal racing except horse racing, motorboat racing, bicycle racing, and motorcycle racing.

For example, for motorboat racing, a "race" is one race in motorboat racing, a "racer" is a combination of a boat racer and a motorboat, and a "pre-race movement" is an exhibition run made before a race. It is possible that an attention point is identified for items in a pre-race exhibition run made by a racer (both a boat racer and a motorboat), such as the course trajectory, the speed, the direction of the motorboat, the angle, the range of swings and the number of swings of the motorboat, and the traveling stability, and that information about the attention point is provided to the user terminal 5.

Also for example, for motorcycle racing, a "race" is one race, a "racer" is a combination of a rider and a motorcycle, and a "pre-race movement" is an exhibition run made before a race. It is possible that an attention point is identified for items in an exhibition run made by a racer, such as the course trajectory, the speed, and the traveling stability of the motorcycle, and that information about the attention point is provided to the user terminal 5.

Also for example, for bicycle racing, a "race" is one race, a "racer" is a combination of a bicyclist and a bicycle, and a "pre-race movement" is an exhibition run made before a race. It is possible that an attention point is identified for items in an exhibition run made by a racer, such as the course trajectory, the speed, the traveling stability, and the posture of the bicyclist, and that information about the attention point is provided to the user terminal 5.

The embodiments have been described assuming a pre-race movement image to be a paddock moving image. Alternatively, detection of a point of difference and identification of an attention point may be all on a still image basis.

8. Program and Storage Medium

The assist information server 2 as embodiments of an information processing device according to the present invention has been described above. A program according to the embodiments is a program for causing the information processing device (e.g., the CPU 101) to execute the processes in the assist information server 2.

A program according to the embodiments is a program for causing an information processing device to execute the following procedure. In a racer identification step, racers entered in a race to be processed are identified. In an attention point identification step, for each of all or some of the racers identified in the racer identification step, a plurality of captured pre-race movement images of pre-race movements (e.g., a paddock walk) made by a racer before a race are retrieved from a storage unit, and an attention point to be paid attention to while pre-race movements are being made are identified using the retrieved pre-race movement images and racing result information corresponding to each pre-race movement image. In a presentation control step, presentation information for presenting information about the attention point identified in the attention point identification step is generated and controlled to be presented on an external terminal.

This program enables the information processing device to act as the assist information server 2 that performs the processes of the above first to third embodiments.

The program can be prestored, for example, in a HDD as a storage medium built in a computer device or in a ROM in a microcomputer including a CPU. Alternatively, the program can be temporarily or permanently stored (recorded) in a removable storage medium, such as a semiconductor memory, a memory card, an optical disk, a magneto-optical disk, or a magnetic disk. Such a removable storage medium can be provided as what is called package software.

The program can not only be installed from the removable storage medium, for example, to a personal computer, but can also be downloaded from a download site over a network, such as a LAN and the Internet.

REFERENCE SIGNS LIST

1 network, 2 assist information server, 2a communication controller, 2b image obtainer, 2c attention point identification unit, 2d racer identification unit, 2e information retriever, 2f DB access unit, 2g presentation controller, 3 competition information server, 5 user terminal, 6 image-capturing device, 7 sending device, 10 storage unit, 11 user DB, 12 racing information DB, 13 prediction/purchase information DB, 14 pre-race movement DB, 15 racer DB

The invention claimed is:
1. An information processing device comprising:
at least one memory operable to store program code; and
at least one processor operable to read the program code and operate as instructed by the program code, the program code including:
racer identification code configured to cause the at least one processor to identify a plurality of racers entered in a race to be processed;
attention point identification code configured to cause the at least one processor to:
retrieve, from a storage, for each of the plurality of racers identified by the racer identification code, a plurality of captured pre-race movement images of first pre-race movements made by each of the plurality of racers, the plurality of captured pre-race movements images being identified as one of a first type pre-race movement image or a second type pre-race movement image based on racing result information from previous races, and
identify an attention point while second pre-race movements are being made by the plurality of racers and analyze each of the plurality of racers based on the retrieved plurality of captured pre-race movement images; and
presentation controlling code configured to cause the at least one processor to generate presentation information for displaying the presentation information including the attention point identified by the attention point identification code prior to the race, and to control the displaying of the presentation information on an external terminal,
wherein the attention point identification code is further configured to cause the at least one processor to:
perform, for each of the plurality of racers, an estimation process for estimating a possibility of one of the plurality of racers being selected by a user requesting information about the attention points,
set an upper limit for a number of attention points for each of the plurality of racers so that more attention points are allocated to the one of the plurality of racers with a higher estimated possibility of being selected, and
identify one or more attention points for the one of the plurality of racers within the upper limit.
2. The information processing device according to claim 1, wherein the attention point identification code is further configured to cause the at least one processor to extract the first type pre-race movement image and the second type pre-race movement image, from among the plurality of captured pre-race movement images in which one of the plurality of racers appears, based on the racing result information corresponding to each pre-race movement image, and identify one or more points of difference based on a comparison between the first type pre-race movement image and the second type pre-race movement image as the attention point of the one of the plurality of racers.
3. The information processing device according to claim 2, wherein
the attention point identification code is further configured to cause the at least one processor to convert the identified points of difference into numbers and calculate a numerical difference between the numbers of the identified points of difference to other points of differences, and identify, from among the identified points of difference, a comparison item based on the numerical difference being greater than a predetermined value, as the attention point.
4. The information processing device according to claim 1, wherein
the estimation process estimates the possibility of the one of the plurality of the racers being selected by the user by using a value indicating a likelihood of the one of the plurality of racers finishing the race in a higher place.

5. The information processing device according to claim 1, wherein
the estimation process estimates the possibility of the one of the plurality of the racers being selected by the user by using at least one of prediction information and purchase information of the user of the external terminal on which the presentation information is to be displayed.

6. The information processing device according to claim 3, wherein
the presentation controlling code is further configured to cause the at least one processor to generate the presentation information by distinguishing each attention point based on the comparison of the first type pre-race movement image and the second type pre-race movement image.

7. The information processing device according to claim 1, wherein
the attention point identification code is further configured to cause the at least one processor to perform a process for identifying the attention point using the plurality of captured pre-race movement images of the race that matches a race to be processed based on racing conditions.

8. The information processing device according to claim 1, wherein
the attention point identification code is further configured to cause the at least one processor to perform, for each of the plurality of racers, a process for identifying the attention point, using pre-race movement images of the race having the racer information that matches racer information of a race to be processed.

9. The information processing device according to claim 1, wherein the first type pre-race movement image is associated with a first racer among the plurality of racers finishing in a higher place in a previous race according to the racing result information, and
wherein the second type pre-race movement image is associated with the first racer among the plurality of racers finishing in a lower place in the previous race according to the racing result information.

10. The information processing device according to claim 1, wherein the presentation information is an image including the second type pre-race movement image partially overlaying on the attention point.

11. An information processing method performed by an information processing device, the method comprising:
identifying a plurality of racers entered in a race to be processed;
retrieving, from a storage, for each of the plurality of racers, a plurality of captured pre-race movement images of first pre-race movements made by each of the plurality of racers, the plurality of captured pre-race movement images being identified as one of a first type pre-race movement image or a second type pre-race movement image based on racing result information from previous races;
identifying an attention point while second pre-race movements are being made by the plurality of racers and analyzing each of the plurality of racers based on the retrieved plurality of captured pre-race movement images;
generating presentation information for displaying the presentation information including the attention point prior to the race; and
controlling the displaying of the presentation information on an external terminal,
wherein the identifying the attention point further comprises:
performing, for each of the plurality of racers, an estimation process for estimating a possibility of one of the plurality of racers being selected by a user requesting information about the attention points,
setting an upper limit for a number of attention points for each of the plurality of racers so that more attention points are allocated to one of the plurality of racers with a higher estimated possibility of being selected, and
identifying one or more attention points of the one of the plurality of racers within the upper limit.

\* \* \* \* \*